United States Patent
Zheng et al.

(10) Patent No.: US 7,769,723 B2
(45) Date of Patent: Aug. 3, 2010

(54) SYSTEM AND METHOD FOR PROVIDING CONTINUOUS DATA PROTECTION

(75) Inventors: Ling Zheng, Sunnyvale, CA (US); Robert M. English, Menlo Park, CA (US); Stephen L. Manley, Pleasanton, CA (US); Blake H. Lewis, Los Altos Hills, CA (US)

(73) Assignee: NetApp, Inc., Sunnyvale, CA (US)

( * ) Notice: Subject to any disclaimer, the term of this patent is extended or adjusted under 35 U.S.C. 154(b) by 333 days.

(21) Appl. No.: 11/413,882

(22) Filed: Apr. 28, 2006

(65) Prior Publication Data
US 2007/0276878 A1    Nov. 29, 2007

(51) Int. Cl.
*G06F 7/00* (2006.01)
(52) U.S. Cl. .................. 707/682; 707/663; 707/664; 707/676; 707/677; 707/681; 707/685
(58) Field of Classification Search .................. None
See application file for complete search history.

(56) References Cited

U.S. PATENT DOCUMENTS

| | | | |
|---|---|---|---|
| 4,156,907 A | 5/1979 | Rawlings et al. |
| 4,399,503 A | 8/1983 | Hawley |
| 4,570,217 A | 2/1986 | Allen et al. |
| 4,598,357 A | 7/1986 | Swenson et al. |
| 4,688,221 A | 8/1987 | Nakamura et al. |
| 4,698,808 A | 10/1987 | Ishii |
| 4,761,785 A | 8/1988 | Clark et al. |
| 4,805,090 A | 2/1989 | Coogan |
| 4,837,675 A | 6/1989 | Bean et al. |
| 4,864,497 A | 9/1989 | Lowry et al. |
| 4,896,259 A | 1/1990 | Jacobs et al. |
| 4,899,342 A | 2/1990 | Potter et al. |
| 4,989,206 A | 1/1991 | Dunphy, Jr. et al. |
| 5,124,987 A | 6/1992 | Milligan et al. |
| RE34,100 E | 10/1992 | Hartness |
| 5,155,835 A | 10/1992 | Belsan |
| 5,163,131 A | 11/1992 | Row et al. |
| 5,202,979 A | 4/1993 | Hillis et al. |

(Continued)

FOREIGN PATENT DOCUMENTS

WO    WO 89/10594    11/1989

(Continued)

OTHER PUBLICATIONS

Administration Guide found at http://www.openafs.org/pages/doc/AdminGuide/auagd010.htm, visited on Mar. 2, 2005.

(Continued)

*Primary Examiner*—Pierre M Vital
*Assistant Examiner*—Mohammad S Rostami
(74) *Attorney, Agent, or Firm*—Cesari and McKenna, LLP

(57) ABSTRACT

A system and method provides continuous data protection using checkpoints in a write anywhere file system. During a consistency point of a write anywhere file system, freed blocks are identified and are appended to a delete log for retention. A consistency point log is updated with a new entry associated with the consistency point. If the file system needs to retrieve its state at a particular point in time, the stored blocks of the delete log may be recovered.

39 Claims, 16 Drawing Sheets

U.S. PATENT DOCUMENTS

| | | | |
|---|---|---|---|
| 5,278,979 | A | 1/1994 | Foster et al. |
| 5,403,667 | A | 4/1995 | Simoens |
| 5,426,747 | A | 6/1995 | Weinreb et al. |
| 5,568,629 | A | 10/1996 | Gentry et al. |
| 5,581,724 | A | 12/1996 | Belsan et al. |
| 5,819,292 | A | 10/1998 | Hitz et al. |
| 6,061,770 | A | 5/2000 | Franklin |
| 6,081,875 | A | 6/2000 | Clifton et al. |
| 6,341,341 | B1 | 1/2002 | Grummon et al. |
| 6,516,380 | B2 | 2/2003 | Kenchammana-Hoskote et al. |
| 6,636,879 | B1 | 10/2003 | Doucette et al. |
| 6,643,654 | B1 | 11/2003 | Patel et al. |
| 6,668,264 | B1 | 12/2003 | Patterson et al. |
| 6,889,228 | B1 | 5/2005 | Federwisch et al. |
| 6,915,316 | B1 | 7/2005 | Patterson et al. |
| 6,993,539 | B2 | 1/2006 | Federwisch et al. |
| 7,007,046 | B2 | 2/2006 | Manley et al. |
| 7,010,553 | B2 | 3/2006 | Chen et al. |
| 7,039,663 | B1 | 5/2006 | Federwisch et al. |
| 7,043,485 | B2 | 5/2006 | Manley et al. |
| 7,127,577 | B2 | 10/2006 | Koning et al. |
| 7,194,597 | B2 | 3/2007 | Willis et al. |
| 7,203,796 | B1 | 4/2007 | Muppalaneni et al. |
| 7,225,204 | B2 | 5/2007 | Manley et al. |
| 7,325,109 | B1 | 1/2008 | Muppalaneni et al. |
| 7,454,445 | B2 | 11/2008 | Lewis et al. |
| 2004/0030668 | A1 | 2/2004 | Pawlowski |
| 2004/0244746 | A1 | 12/2004 | Kinugawa |
| 2005/0144202 | A1* | 6/2005 | Chen ................... 707/205 |
| 2005/0182910 | A1* | 8/2005 | Stager et al. ............ 711/162 |
| 2005/0193272 | A1* | 9/2005 | Stager et al. ............ 714/42 |
| 2005/0246401 | A1 | 11/2005 | Edwards et al. |
| 2006/0047925 | A1 | 3/2006 | Perry |
| 2006/0101384 | A1* | 5/2006 | Sim-Tang et al. ........ 717/104 |
| 2006/0184587 | A1 | 8/2006 | Federwisch et al. |
| 2006/0218210 | A1 | 9/2006 | Sarma et al. |
| 2007/0033370 | A1* | 2/2007 | Zohar et al. ............ 711/173 |
| 2007/0083567 | A1* | 4/2007 | Arai et al. .............. 707/200 |
| 2007/0088702 | A1 | 4/2007 | Fridella et al. |
| 2007/0112894 | A1* | 5/2007 | Okada et al. ............ 707/204 |
| 2007/0198604 | A1* | 8/2007 | Okada et al. ............ 707/202 |
| 2007/0220309 | A1* | 9/2007 | Andre et al. ............ 714/6 |
| 2007/0239793 | A1* | 10/2007 | Tyrrell et al. ............ 707/200 |
| 2009/0006792 | A1 | 1/2009 | Federwisch et al. |
| 2009/0030983 | A1 | 1/2009 | Malaiyandi et al. |

FOREIGN PATENT DOCUMENTS

| | | |
|---|---|---|
| WO | WO 02/29573 | 4/2002 |
| WO | WO 2004/044746 | 5/2004 |

OTHER PUBLICATIONS

Basilico, et al., *Error Correction System Using "Shadow Memory,"* IBM Technical Disclosure Bulletin, May 1984, pp. 5792-5793.

Bitton, Dina, *Disk Shadowing*, Proceedings of the 14$^{th}$ VLDB Conference, LA, CA (1988).

Blasgen, M.W. et al., *System R:An architectural Overview*,Reprinted from IBM Systems Journal vol. 20, No. 1, 1981 © 1981, 1999.

Borenstein, Nathaniel S., *CMU's Andrew project a retrospective*, Communications of ACM, (39)12, Dec. 1996.

Brown, Mark R. et al., *The Alpine file system*, ACM Transactions on Computing Systems, 3(4):261-293, Nov. 1985.

Chen, Peter M., et al., *An Evaluation of Redundant Arrays of Disks Using an Amdahl 5890* Performance Evaluation, pp. 74-85, 1990.

Chutani, Sailesh, et al., *The Episode file system*, In Proceedings of the USENIX Winter 1992.

Clark, B.E., et al., *Application System /400 Performance Characteristics*, IBM Systems Journal, 28(3): 407-423, 1989.

Data Sheet for the Check Point Software Technologies product Flood-Gate-1 (1997).

Dibble, Peter C., et al., Beyond Striping: The Bridge Multiprocessor File System, Computer Science Department, University of Rochester, Aug. 11, 1989.

Douglis, Fred, et al., *A comparison of two distributed systems: Amoeba and Sprite*—Computing Systems, 4(4), Fall 1991, pp. 353-385.

Gait, Jason, *Phoenix: A Safe In-Memory File System*. Communications of the ACM, 33(1):81-86, Jan. 1990.

Hartman, John H. et al., *Performance Measurements of a Multiprocessor Sprite Kernel*, Proceedings of the USENIX Conference, 1990.

Hitz, Dave et al., *File System Design for an NFS File Server Appliance*, Technical Report 3002, Rev. C395, presented Jan. 19, 1994.

Hitz, David, et al. *System and Method for Enabling a Storage System to Support Multiple Volume Formats Simultaneously*, U.S. Appl. No. 60/652,626, filed Feb. 14, 2005.

Howard, John H, et al. *Scale and Performance in a Distributed File System*, Carnegie Mellon University, CMU-ITC-87-068, Aug. 5, 1987.

Howard, John, H. et al., *Scale and performance in a distributed file system*, ACM Trans. Computer. System., 6(1), Feb. 1988 pp. 51-81.

Isomaki, Markus, *Differentiated Service for the Internet*, Department of Technical Physics and Mathematics, May 9, 1998.

Kazar, Michael L., et al., *Decorum File System Architectural Overview*, USENIX Summer Conference, Anaheim, California, 1990.

Lorie, Raymond, A, *Physical integrity in a large segmented database*, ACM Trans. Database Systems, (2)1: 91-104, Mar. 1977.

Lorie, RA, *Shadow Page Mechanism*, IBM Technical Disclosure Bulletin, Jun. 1986, pp. 340-342.

McKusick, Marshall Kirk, et al., *A Fast File System for UNIX*, Computer Science Division, Department of Electrical Engineering and Computer Sciences, Univ. of CA, Berkley, Feb. 18, 1994.

Miller, Ethan L., et al., *RAMA:A File System for Massively Parallel Computers*, 12$^{th}$ IEEE Symposium on Mass Storage Systems, Monterey CA, Apr. 1993, pp. 163-168.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-67.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-67.

Ousterhout, John K. et al., *The Sprite Network Operating System*, Computer Science Division, Department of Electrical Engineering and Computer Sciences, Univ. of CA, Berkley, Nov. 19, 1987.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Ousterhout, John, *Why Aren't Operating Systems Getting Faster as Fast as Hardware?*, Digital WRL Technical Note TN-11, Oct. 1989.

Ousterhout, John, *A Brief Retrospective on the Sprite Network Operating System*, found at http://www.cs.berkeley.edu/projects/sprite/retrospective.html,visited on Mar. 11, 2005.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).

Peterson, Zachary Nathaniel Joseph, *Data Placement for Copy-on-Write Using Virtual Contiguity*, University of CA, Santa Cruz, Master of Science in Computer Science Thesis, Sep. 2002.

Quinlan, Sean, *A Cached WORM File System*, Software-Practice and Experience, 21(12):1289-1299 (1991).

Redundant Array of Independent Disks, from Wikipedia, the free encyclopedia, found at http://en.wikipedia.org/wiki/RAID, visited on Mar. 9, 2005.

Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.

Rosenblum, Mendel, et al., *The LFS Storage Manager*, Computer Science Division, Electrical Engin. And Computer Sciences, Univ. of CA, presented at Summer '90 USENIX Technical Conference, Anaheim, CA Jun. 1990.

Rosenblum, Mendel, et al, The *Design and Implementation of a Log-Structured File System* Jul. 24, 1991 pp. 1-15.

Rosenblum, Mendel, et al., *The Design and Implementation of a Log-Structured File System*, , In Proceedings of ACM Transactions on Computer Systems, (10)1:26-52, Feb. 1992.

Sandberg, Russel et al., *Design and implementation of the Sun Network Filesystem*. In Proc. Summer 1985 USENIX Conf., pp. 119-130, Portland OR (USA), Jun. 1985.

Santry, Douglas S., et al., *Deciding When to Forget in the Elephant File System*, Operating Systems Review, 34(5), (Dec. 1999) pp. 110-123.

Satyanarayanan, M., et al., *The ITC Distributed File System: Principles and Design*, In Proceedings of the 10th ACM Symposium on Operating Systems Principles, (19)5:56-67, Dec. 1985.

Satyanarayanan,.M.. *A survey of distributed file-systems*. Annual Review of Computing Science, 4(73-104), 1989.

Satyanarayanan, M., et al, *Coda: A highly available file system for a distributed workstation environment*. IEEE Transactions on Computers, 39(4):447-459, 1990.

Satyanarayanan, Mahadev, *Scalable, Secure, and Highly Available Distributed File Access*, Computer May 1990: 9-21.

Sidebotham, Bob, *Volumes: The Andrew File System Data Structuring Primitive*, EEUG Conference Proceedings, Manchester, UK, Autumn 1986.

User Guide found at http://www.openafs.org/pages/doc/UserGuide/auusg004.htm, visited on Mar. 2, 2005.

Welch, Brent B., et al., *Pseudo Devices: User-Level Extensions to the Sprite File System*, Computer Science Division, Department of Electrical Engineering and Computer Sciences, Univ. of CA, Berkley, Apr. 1988.

Welch, Brent B., et al., *Pseudo-File-Systems*, Computer Science Division, Department of Electrical Engineering and Computer Sciences, Univ. of CA, Berkley, Oct. 1989.

Wittle, Mark, et al, *LADDIS: The next generation in NFS file server benchmarking*, USENIX Association Conference Proceedings, Apr. 1993.

Akyurek, Sedat, Placing Replicated Data to Reduce Seek Delays, Department of Computer Science, University of Maryland, UMIACS-TR-91-121, CS-TR-2746, Aug. 1991.

Chaudhuri, Surajit, et al., Self-Tuning Technology in Microsoft SQL Server, Data Engineering Journal 22, 2 1999 pp. 20-27.

Coyne, Robert A., et al., Storage Systems for National Information Assets, Proc. Supercomputing 92, Minneapolis, Nov. 1992, pp. 626-633.

Finlayson, Ross S., et al., Log Files: An Extended File Service Exploiting Write-Once Storage Department of Computer Science, Stanford University, Report No. STAN-CS-87-1177, Sep. 1987.

Gray, Jim, et al., The Recovery Manager of the System R Database Manager, ACM Computing Surveys, (13)2:223-242 1981.

Hecht, Matthew S., et al. Shadowed Management of Free Disk Pages with a Linked List, ACM Transactions on Database Systems, 8/4, Dec. 1983, pp. 503-514.

Kemper, Alfons, et al., Performance Tuning for SAP R/3, Data Engineering Journal 22, 2 1999 pp. 33-40.

Kent, Jack et al., Optimizing Shadow Recovery Algorithms, IEEE Transactions on Software Engineering, 14( 2): 155-168 , Feb. 1988.

Kistler, et al., Disconnected Operation in the Coda File System, ACM Transactions on Computer Systems, vol. 10, No. 1, Feb. 1992, pp. 3-25.

Schiefer, Berni, et al., DB2 Universal Database Performance Tuning, Data Engineering Journal 22, 2 1999 pp. 12-19.

Seltzer, Margo I., et al., Journaling Versus Soft Updates: Asynchronous Meta-Data Protection in File Systems, Proceedings of 200 USENIX Annual Technical Conference, Jun. 18-23, 2000.

Shasha, Dennis, Tuning Time Series Queries in Finance: Case Studies and Recommendations, Data Engineering Journal 22, 2 1999 pp. 41-47.

Subramanian, Muralidhar, et al., Performance Challenges in Object-Relational DBMSs, Data Engineering Journal 22, 2 1999 pp. 28-32.

Weikum, Gerhard, et al., Towards Self-Tuning Memory Management for Data Servers, Data Engineering Journal 22, 2 1999 pp. 3-11.

West, Michael, et al. The ITC Distributed File System: Prototype and Experience, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

"Notification of Transmittal of the International Search Report and the Written Opinion of the International Searching Authority, or the Declaration", issued for International Application No. PCT/US2007/010223, filed Apr. 26, 2007, Mailed Oct. 1, 2008, 16 pages.

Federwisch et al. "System and Method for Determining Changes in Two Snapshots and for Transmitting Changes to a Destination Snapshot", filed Jan. 20, 2006 as U.S. Appl. No. 11/336,021, 70 pages.

Lin et al. "System and Method for Transparent Data Replication over Migrating Virtual Servers", filed Apr. 24, 2007 as U.S. Appl. No. 11/739,239, 30 pages.

Howard, John H., An Overview of the Andrew File System, Carnegie Mellon University, CMU-ITC-88-062 1988, 6 pages.

*The IBM System/38* Chapter 8, 1984, pp. 137-157.

Lomet, David., et al., The Performance of a Multiversion Access Method, ACM SIGMOD International Conference on Management of Data, 19:353-363, 1990.

Satyanarayanan, M., et al., Coda: A Highly Available File System for a Distributed Workstation Environment, Carnegie Mellon University, 1990, 5 pages.

Kazar, Michael L., Synchronization and Caching Issues in the Andrew File System, Carnegie Mellon University, CMU-ITC-88-063, 1988, 12 pages.

\* cited by examiner

SYSTEM AND METHOD FOR PROVIDING CONTINUOUS DATA PROTECTION

FIELD OF THE INVENTION

The present invention relates to storage systems and, more specifically, to a technique that provides continuous data protection in a storage system.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system. The file system typically consists of a contiguous range of vbns from zero to n, for a file system of size n+1 blocks.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., Sunnyvale, Calif.

The storage system may be configured to operate according to a client/server model of information delivery to thereby allow many clients to access the directories, files and blocks stored on the system. In this model, the client may comprise an application, such as a database application, executing on a computer that "connects" to the storage system over a computer network, such as a point-to-point link, shared local area network, wide area network or virtual private network implemented over a public network, such as the Internet. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

A write-anywhere file system (such as the WAFL file system) may have the capability to generate a snapshot of its active file system. An "active file system" is a file system to which data can be both written and read, or, more generally, an active store that responds to both read and write I/O operations. It should be noted that "snapshot" is a trademark of Network Appliance, Inc. and is used for purposes of this patent to designate a persistent consistency point (CP) image. A persistent consistency point image (PCPI) is a space conservative, point-in-time read-only image of data accessible by name that provides a consistent image of that data (such as a storage system) at some previous time. More particularly, a PCPI is a point-in-time representation of a storage element, such as an active file system, file or database, stored on a storage device (e.g., on disk) or other persistent memory and having a name or other identifier that distinguishes it from other PCPIs taken at other points in time. In the case of the WAFL file system, a PCPI is an active file system image that contains complete information about the file system, including all metadata. A PCPI can also include other information (metadata) about the active file system at the particular point in time for which the image is taken. The terms "PCPI" and "snapshot" may be used interchangeably through out this patent without derogation of Network Appliance's trademark rights.

The active map denotes a file including a bitmap associated with a free status of the active file system. As noted, a logical volume may be associated with a file system; the term "active file system" thus also refers to a consistent state of a current file system. The summary map denotes a file including an inclusive logical OR bitmap of all snapmaps. By examining the active and summary maps, the file system can determine whether a block is in use by either the active file system or any snapshot. The space map denotes a file including an array of numbers that describe the number of storage blocks used in a block allocation area. In other words, the space map is essentially a logical OR bitmap between the active and summary maps to provide a condensed version of available "free block" areas within the vbn space. Examples of snapshot and block allocation data structures, such as the active map, space map and summary map, are described in U.S. Pat. No. 7,454,445, titled INSTANT SNAPSHOT, by Blake Lewis, et al., issued on Nov. 18, 2008, which is hereby incorporated by reference.

The write-anywhere file system typically performs write allocation of blocks in a logical volume in response to an event in the file system (e.g., dirtying of the blocks in a file). When write allocating, the file system uses the block allocation data structures to select free blocks within its vbn space to which to write the dirty blocks. The selected blocks are generally in the same positions along the disks for each RAID group (i.e., within a stripe) so as to optimize use of the parity disks. Stripes of positional blocks may vary among other RAID groups to, e.g., allow overlapping of parity update operations. When write allocating, the file system traverses a small portion of each disk (corresponding to a few blocks in depth within each disk) to essentially "lay down" a plurality of stripes per RAID group. In particular, the file system chooses vbns that are on the same stripe per RAID group during write allocation using the vbn-to-disk,dbn mappings.

The write-anywhere file system further supports multiple PCPIs that are generally created on a regular schedule. Without limiting the generality of the term, each PCPI illustratively refers to a copy of the file system that diverges from the active file system over time as the active file system is modified. In the case of the WAFL file system, the active file system diverges from the PCPIs since the PCPIs stay in place as the active file system is written to new disk locations. Each PCPI is a restorable version of the storage element (e.g., the active file system) created at a predetermined point in time and, as noted, is "read-only" accessible and "space-conservative". Space conservative denotes that common parts of the storage element in multiple PCPIs share the same file system blocks. Only the differences among these various PCPIs require extra storage blocks. The multiple PCPIs of a storage element are not independent copies, each consuming disk space; therefore, creation of a PCPI on the file system is instantaneous, since no entity data needs to be copied. Read-only accessibility denotes that a PCPI cannot be modified because it is closely coupled to a single writable image in the active file system. The closely coupled association between a file in the active file system and the same file in a PCPI obviates the use of multiple "same" files. In the example of a WAFL file system, PCPIs are described in *TR3002 File System Design for a NFS File Server Appliance* by David Hitz et al., published by Network Appliance, Inc. and in U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz et al., each of which is hereby incorporated by reference as though fully set forth herein.

Broadly stated, a PCPI is stored on-disk along with the active file system, and is loaded into the memory of the storage system as requested by the storage operating system. The on-disk organization of the PCPI and the active file system can be understood from the following description of an exemplary file system inode structure 100 shown in FIG. 1. A file system information (fsinfo) block 102 includes the inode for an inode file 105 which contains information describing the inode file associated with a file system. In this exemplary file system inode structure, the inode for the inode file 105 contains a pointer that references (points to) an inode file indirect block 110. The inode file indirect block 110 contains a set of pointers that reference inode file blocks, each of which contains an array of inodes 117, that, in turn, contain pointers to indirect blocks 119. The indirect blocks 119 include pointers to file data blocks 120A, 120B and 120C. Each of the file data blocks 120(A-C) is capable of storing, e.g., 4 kilobytes (KB) of data.

When the file system generates a PCPI of its active file system, a PCPI fsinfo block 202 is generated as shown in FIG. 2. The PCPI fsinfo block 202 includes a PCPI inode for the inode file 205. The PCPI inode for the inode file 205 is, in essence, a duplicate copy of the inode for the inode file 105 of the file system 100 that shares common parts, such as inodes and blocks, with the active file system. For example, the exemplary file system structure 200 includes the inode file indirect blocks 110, inodes 117, indirect blocks 119 and file data blocks 120A-C as in FIG. 1. When a user modifies a file data block, the file system writes the new data block to disk and changes the active file system to point to the newly created block. FIG. 3 shows an exemplary inode file system structure 300 after a file data block has been modified. In this example, file data block 120C is modified to file data block 120C'. As a result, the contents of the modified file data block are written to a new location on disk as a function of the exemplary file system. Because of this new location, the indirect block 319 must be rewritten. Due to this changed indirect block 319, the inode 317 must be rewritten. Similarly, the inode file indirect block 310 and the inode for the inode file 305 must be rewritten.

Thus, after a file data block has been modified the PCPI inode 205 contains a pointer to the original inode file indirect block 110 which, in turn, contains pointers through the inode 117 and indirect block 119 to the original file data blocks 120A, 120B and 120C. The newly written indirect block 319 also includes pointers to unmodified file data blocks 120A and 120B. That is, the unmodified data blocks in the file of the active file system are shared with corresponding data blocks in the PCPI file, with only those blocks that have been modified in the active file system being different than those of the snapshot file.

However, the indirect block 319 further contains a pointer to the modified file data block 120C' representing the new arrangement of the active file system. A new inode for the inode file 305 is established representing the new structure 300. Note that metadata (not shown) stored in any PCPI blocks (e.g., 205, 110, and 120C) protects these blocks from being recycled or overwritten until they are released from all PCPIs. Thus, while the active file system inode for the inode file 305 points to new blocks 310, 317, 319, 120A, 120B and 120C', the old blocks 205, 110 and 120C are retained until the PCPI is fully released.

A storage system administrator may desire continuous data protection (CDP) that retains all changes to a file system to provide data recovery to any point in time within a specified retention period. A typical CDP retention period may range from a few hours to a few weeks. Data is protected beyond the CDP retention period by conventional non-CDP mechanisms, e.g., archival tape, etc.

Additionally, regulated industries may require retaining all relevant versions of certain data to meet legal requirements. Examples include the Federal Information Security Management Act (FISMA) of 2002, which requires companies to provide technical safeguards, e.g., an audit trail on data or the Sarbanes-Oxley Act (SOX) of 2002, which requires strict record retention to prevent fraud and/or accidental data loss. These are illustrative United States laws, but similar requirements may be found in corresponding laws of other countries. The optimal technique for meeting these regulatory requirements is to retain all past versions of data. The data retention period may last from, e.g., seven years to an indefinite period of time. When the retention period expires, the relevant versions of the data need to be deleted permanently.

In the example of the WAFL file system, a consistency point (CP) occurs at frequent intervals. During a CP, all in-memory data changes are flushed to disk so that the on-disk file system structure becomes fully consistent. A CP may occur every 10 seconds based on a timer or may occur on a more frequent basis if the memory for storing changes is fully utilized. Additionally, an administrator may desire to manually trigger a CP using, for example, a command line interface (CLI) command. One technique to provide CDP is to cause the file system to generate a PCPI at each CP.

The CP arrangement described above differs from a typical storage system, where PCPIs typically are generated on an hourly basis. Any changes that occur during CPs between PCPIs are not protected and are therefore not recoverable. PCPIs may be generated on a more frequent basis; however, a noted disadvantage of more frequent PCPI generation is that the creation of each PCPI requires the logical OR'ing of each of the summary maps from each PCPI to create the summary map for the active file system. In an example of a storage system supporting 255 PCPIs, the time required to perform this logical OR operation may introduce a level of undesirable latency into the PCPI creation process. Thus, by increasing the number of PCPIs retained, there is a concomitant increase in the time required to perform the logical OR operations at each PCPI creation, thereby increasing the overall latency of the storage system. If a PCPI were to be created at each CP, the performance of the storage system would quickly degrade to an unacceptable level.

SUMMARY OF THE INVENTION

The present invention overcomes the disadvantages of the prior art by providing a technique for continuous data protection (CDP) using checkpointing and/or file operation logging in a file system. In a first embodiment, the file system is modified so that during a consistency point (CP) a checkpoint is created by retaining blocks that were freed during write allocation to thereby prevent the blocks from being reclaimed (and reused) by the file system. The freed blocks are illustratively retained in a delete log comprising a container file configured to store each of the retained blocks in the file system. Blocks are added to the delete log by inserting the appropriate virtual block number (vbn) or virtual volume block number (vvbn) pointers of the freed blocks into an inode buffer tree of the delete log such that the newly added blocks are appended to the end of the delete log. Thus, each block of the delete log is a retained block that was previously freed during a CP. By indexing into the delete log, the file system can retrieve data from any retained block to thereby reconstruct the state of the file system as of a particular CP.

Additionally, during each CP, an entry in a CP log is generated that contains an offset identifying the starting location within the delete log of the blocks that were added since the start of the CP. The file system may subsequently access an entry of the CP log to identify the starting location of the blocks associated with a particular CP and thereby locate any of the blocks within the delete log.

Furthermore, the file system implements a set of administrator defined retention policies. An administrator may set a retention period for blocks retained in the delete log based on one or more thresholds, such as time, number of CPs retained and/or the size (amount) of the container file consumed by the retained checkpoints. When any of the retention thresholds is exceeded, the file system frees blocks associated with CPs until the retained blocks are below the threshold. The blocks freed from the delete log are reclaimed by the file system for reuse during future write allocation. Illustratively, the delete log is a embodied as a first-in first-out (FIFO) data structure so that when blocks are freed from the delete log for reclamation, the oldest blocks, i.e., those blocks associated with the CP with the earliest timestamp, are freed first. However, in alternate implementations may permit blocks to be freed in a different order.

The user interfaces are modified to allow users or applications to specify any point in time for accessing data contained in checkpoints. This any point in time interface permits users to access checkpoints without having to know the exact creation time of the checkpoint. When the specified time does not match the creation time of any checkpoint, the immediately preceding checkpoint created prior to the specified time is utilized. Such interfaces also have the advantage of being able to accommodate finer granularity.

In a second embodiment, each received file operation is logged in persistent memory such as a non-volatile log (NV-Log) stored in a non-volatile random access memory (NVRAM). During each CP, the contents of the NVLog are flushed (written) to a file operations log stored within the file system. This second embodiment may be combined with the first embodiment. With the first embodiment, blocks of all checkpoints are retained, therefore, the data in the NVLog could be replaced with pointers to the newly written data on disk to avoid writing the same data twice. At a later point in time, the contents of the file operations log may be examined to determine the order of operations received as well as changes to data that were not reflected in a CP.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage System Environment

Figure 1:
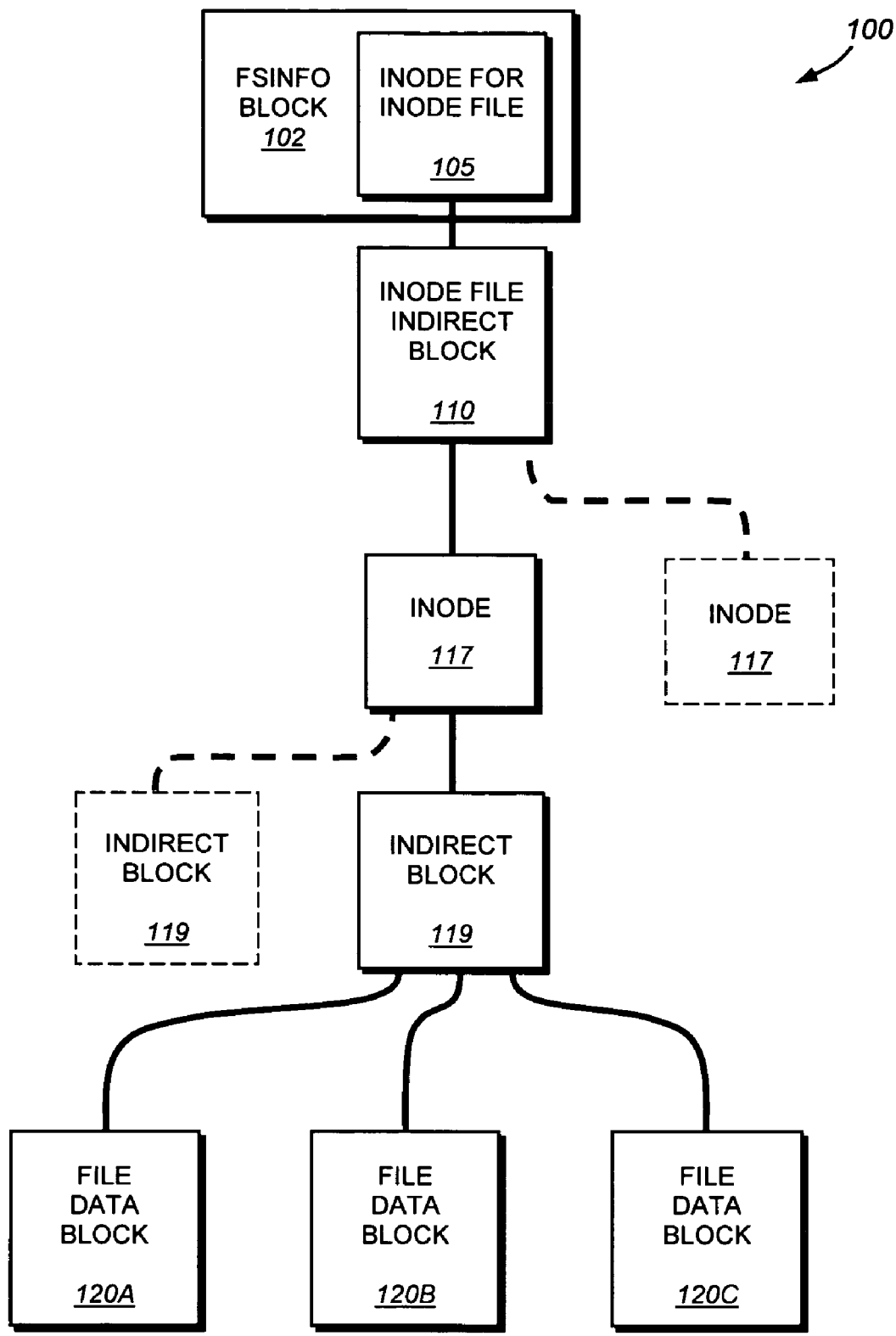
FIG. 1, previously described, is a schematic block diagram of an exemplary file system inode structure.
Figure 2:
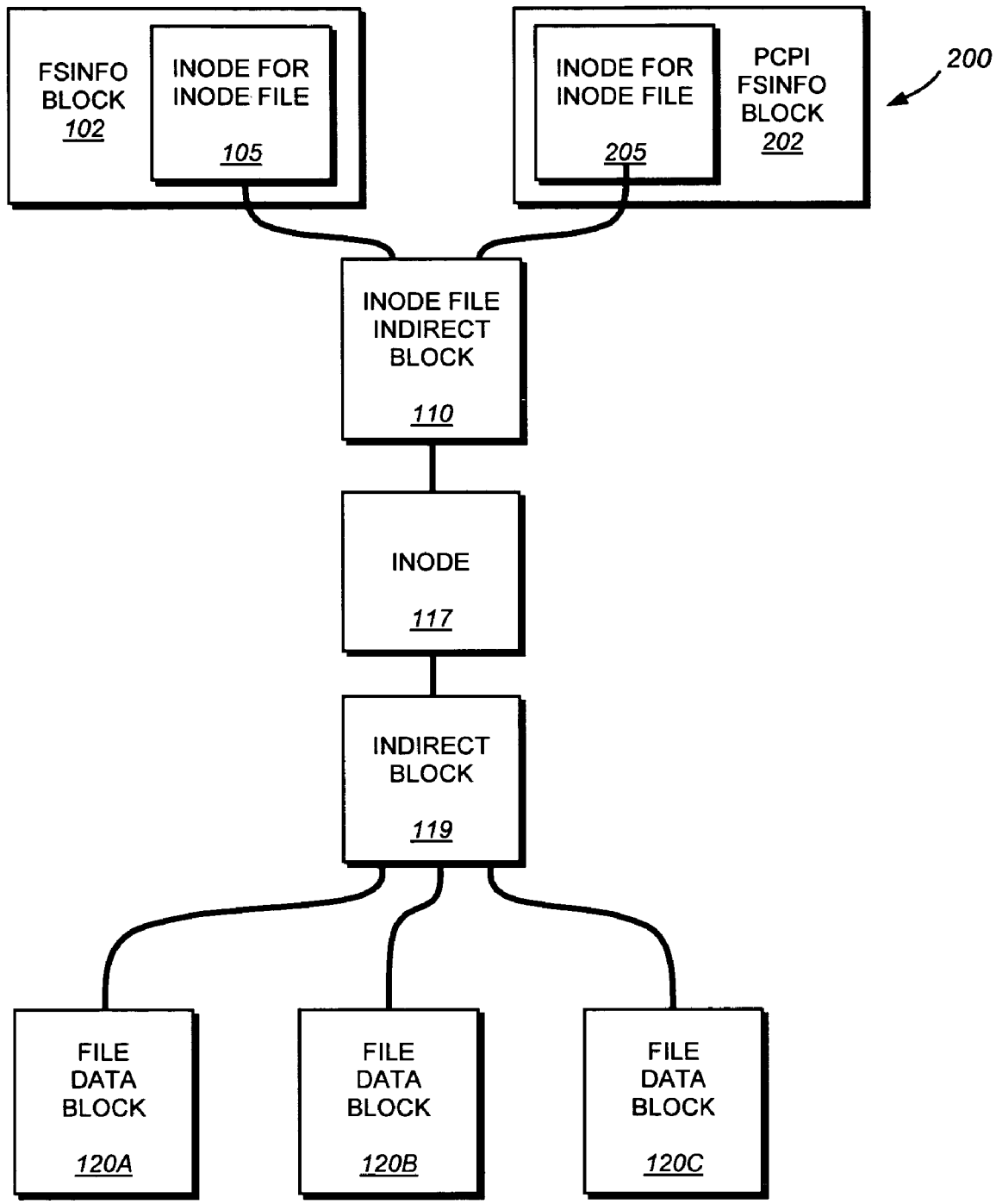
FIG. 2, previously described, is a schematic block diagram of the exemplary file system inode structure of FIG. 1 including a persistent consistency point image (PCPI) inode.
Figure 3:
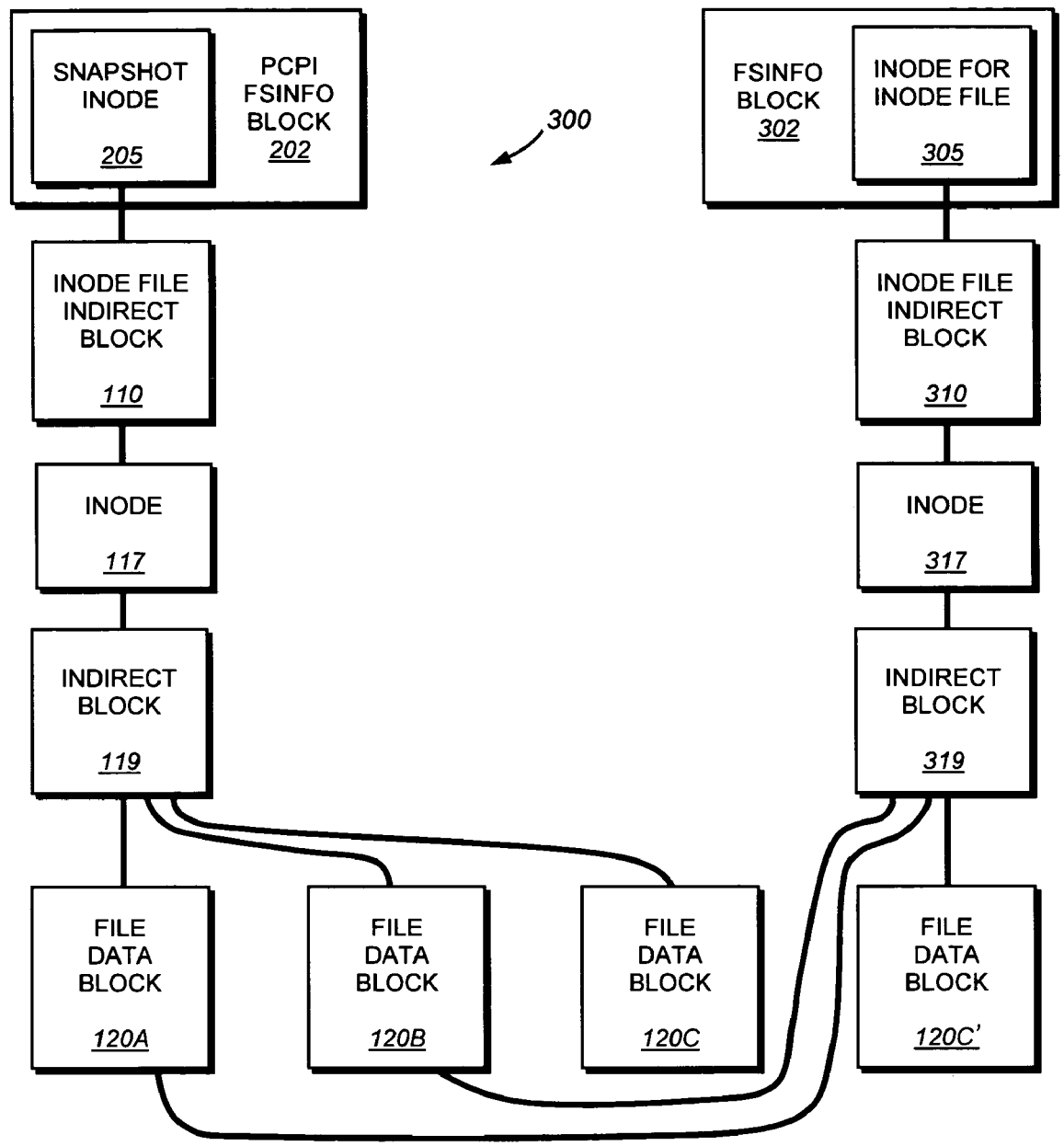
FIG. 3, previously described, is a schematic block diagram of an exemplary file system inode structure of FIG. 2 after a data block has been rewritten.
Figure 4:
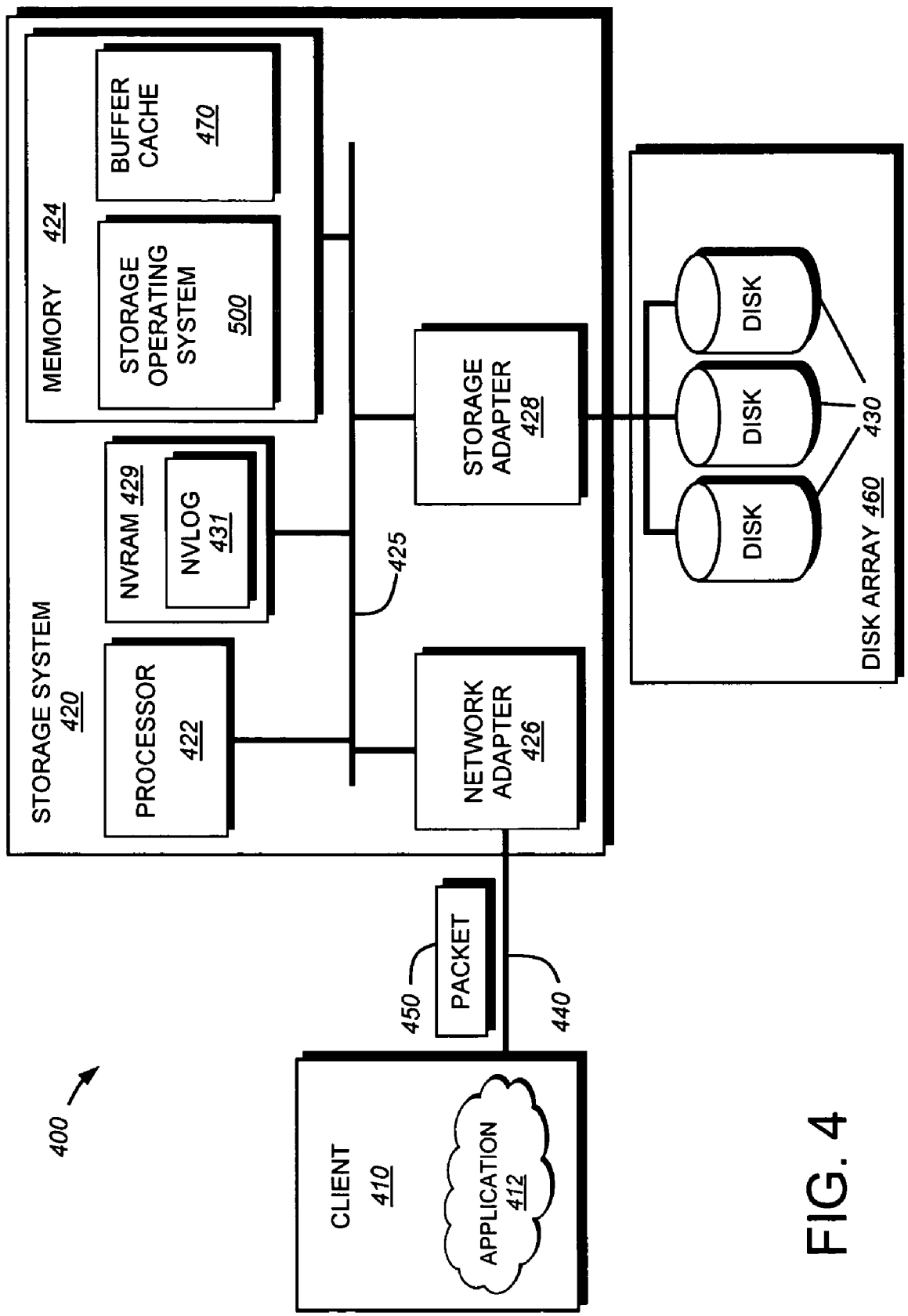
FIG. 4 is a schematic block diagram of storage system environment in accordance with an embodiment of the present invention.

FIG. 4 is a schematic block diagram of an environment 400 including a storage system 420 that may be advantageously used with the present invention. The storage system is a computer that provides storage service relating to the organization of information on storage devices, such as disks 430 of a disk array 460. The storage system 420 comprises a processor 422, a memory 424, a network adapter 426, a non-volatile random access memory (NVRAM) 429 and a storage adapter 428 interconnected by a system bus 425. The storage system 420 also includes a storage operating system 500 that preferably implements a high-level module, such as a file system, to logically organize the information as a hierarchical structure of directories, files and special types of files called virtual disks (hereinafter "blocks") on the disks.

In the illustrative embodiment, the memory 424 comprises storage locations that are addressable by the processor and adapters for storing software program code. A portion of the memory may be further organized as a "buffer cache" 470 for storing data structures associated with the present invention. Additionally the NVRAM 429 may be utilized for storing changes to the file system between consistency points. Such changes may be stored in a nonvolatile log (NVLOG) 431 that is, during the course of a consistency point, flushed (written) to disk. In accordance with a second embodiment of the present invention, the contents of the NVLog 431 are stored within a file operations log, which enables a storage system user to determine the ordering of operations received by the storage system. The processor and adapters may, in turn, comprise processing elements and/or logic circuitry configured to execute the software code and manipulate the data structures. Storage operating system 500, portions of which are typically resident in memory and executed by the processing elements, functionally organizes the system 420 by, inter alia, invoking storage operations executed by the storage system. It will be apparent to those skilled in the art that other processing and memory means, including various computer readable media, may be used for storing and executing program instructions pertaining to the inventive technique described herein.

The network adapter 426 comprises the mechanical, electrical and signaling circuitry needed to connect the storage system 420 to a client 410 over a computer network 440, which may comprise a point-to-point connection or a shared medium, such as a local area network. Illustratively, the computer network 440 may be embodied as an Ethernet network or a Fibre Channel (FC) network. The client 410 may communicate with the storage system over network 440 by exchanging discrete frames or packets 450 of data according to pre-defined protocols, such as the Transmission Control Protocol/Internet Protocol (TCP/IP).

The client 410 may be a general-purpose computer configured to execute applications 412. Moreover, the client 410 may interact with the storage system 420 in accordance with a client/server model of information delivery. That is, the client may request the services of the storage system, and the system may return the results of the services requested by the client, by exchanging packets 450 over the network 440. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 428 cooperates with the storage operating system 500 executing on the system 420 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 430, such as HDD and/or DASD, of array 460. The storage adapter includes input/output (I/O) interface circuitry that couples to the disks over an I/O interconnect arrangement, such as a conventional high-performance, FC serial link topology.

Storage of information on array 460 is preferably implemented as one or more storage "volumes" that comprise a collection of physical storage disks 430 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

B. Storage Operating System

To facilitate access to the disks 430, the storage operating system 500 implements a write-anywhere file system that cooperates with virtualization modules to "virtualize" the storage space provided by disks 430. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

Figure 5:
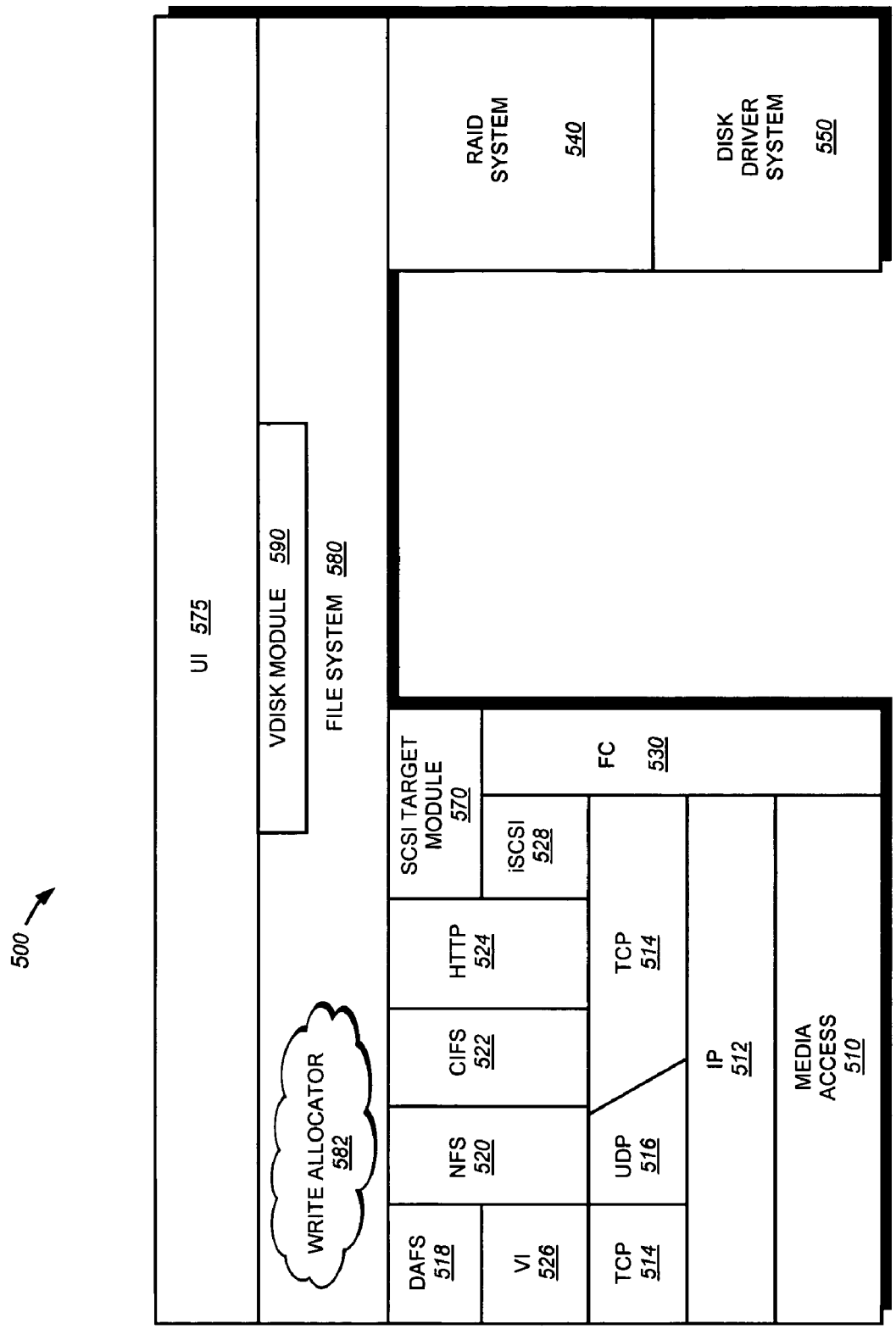
FIG. 5 is a schematic block diagram of a storage operating system in accordance with an embodiment of the present invention.

FIG. 5 is a schematic block diagram of the storage operating system 500 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 510 of network drivers (e.g., gigabit Ethernet drivers) that interfaces to network protocol layers, such as the IP layer 512 and its supporting transport mechanisms, the TCP layer 514 and the User Datagram Protocol (UDP) layer 516. A file system protocol layer provides multi-protocol file access and, to that end, includes support for the Direct Access File System (DAFS) protocol 518, the NFS protocol 520, the CIFS protocol 522 and the Hypertext Transfer Protocol (HTTP) protocol 524. A VI layer 526 implements the VI architecture to provide direct access transport (DAT) capabilities, such as RDMA, as required by the DAFS protocol 518.

An iSCSI driver layer 528 provides block protocol access over the TCP/IP network protocol layers, while a FC driver layer 530 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage module embodied as a RAID system 540 that manages the storage and retrieval of information to and from the volumes/disks in accordance with I/O operations, and a disk driver system 550 that implements a disk access protocol such as, e.g., the SCSI protocol.

Bridging the disk software layers with the integrated network protocol stack layers is a virtualization system that is implemented by a file system 580 interacting with virtualization modules illustratively embodied as, e.g., vdisk module 590 and SCSI target module 570. The vdisk module 590 is layered on the file system 580 to enable access by administrative interfaces, such as a user interface (UI) 575, in response to a user (system administrator) issuing commands to the storage system. The SCSI target module 570 is disposed between the FC and iSCSI drivers 528, 530 and the file system 580 to provide a translation layer of the virtualization system between the block (lun) space and the file system space, where luns are represented as blocks. The UI 575 is disposed over the storage operating system in a manner that enables administrative or user access to the various layers and systems.

The file system is illustratively a message-based system that provides logical volume management capabilities for use in access to the information stored on the storage devices, such as disks. That is, in addition to providing file system semantics, the file system 580 provides functions normally associated with a volume manager. These functions include (i) aggregation of the disks, (ii) aggregation of storage bandwidth of the disks, and (iii) reliability guarantees, such as mirroring and/or parity (RAID). The file system 580 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (FS) info block specifies the layout of information in the file system and includes an inode of a file that includes all other inodes of the file system. Each logical volume (file system) has an FS info block that is preferably stored at a fixed location within, e.g., a RAID group. The inode of the inode file may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a request from the client 410 is forwarded as a packet 450 over the computer network 440 and onto the storage system 420 where it is received at the network adapter 426. A network driver (of layer 510 or layer 530) processes the packet and, if appropriate, passes it on to a network protocol and file access layer for additional processing prior to forwarding to the write-anywhere file system 580. Here, the file system generates operations to load (retrieve) the requested data from disk 430 if it is not resident "in core", i.e., in the buffer cache 470. If the information is not in the cache, the file system 580 indexes into the inode file using the inode number to access an appropriate entry and retrieve a logical vbn. The file system then passes a message structure including the logical vbn to the RAID system 540; the logical vbn is mapped to a disk identifier and disk block number (disk,dbn) and sent to an appropriate driver (e.g., SCSI) of the disk driver system 550. The disk driver accesses the dbn from the specified disk 430 and loads the requested data block(s) in buffer cache 470 for processing by the storage system. Upon completion of the request, the storage system (and operating system) returns a reply to the client 410 over the network 440.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 420 in response to a request issued by client 410. Moreover, in another alternate embodiment of the invention, the processing elements of adapters 426, 428 may be configured to offload some or all of the packet processing and storage access operations, respectively, from processor 422, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system semantics. In this sense, the ONTAP software is an example of such a storage operating system implemented as a microkernel and including the file system 580 to implement the WAFL file system semantics and manage data access. Illustratively, the file system 80 implements the novel CDP technique of the present invention by creating checkpoints at each CP, however, in alternate embodiments, the checkpointing functionality may be implemented in modules other than the file system 580. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., file server, filer or multi-protocol storage appliance) or general-purpose computer, including a standalone computer or portion thereof, embodied as or including a storage system 420. An example of a multi-protocol storage appliance that may be advantageously used with the present invention is described in U.S. patent application Ser. No. 10/215,917 titled, MULTI-PROTOCOL STORAGE APPLIANCE THAT PROVIDES INTEGRATED SUPPORT FOR FILE AND BLOCK ACCESS PROTOCOLS, filed on Aug. 8, 2002, by Pawlowski et al., published as U.S. Patent Publication No. 2004/0030668 A1 on Feb. 12, 2004. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

C. On-Disk File System Structures

Figure 6:
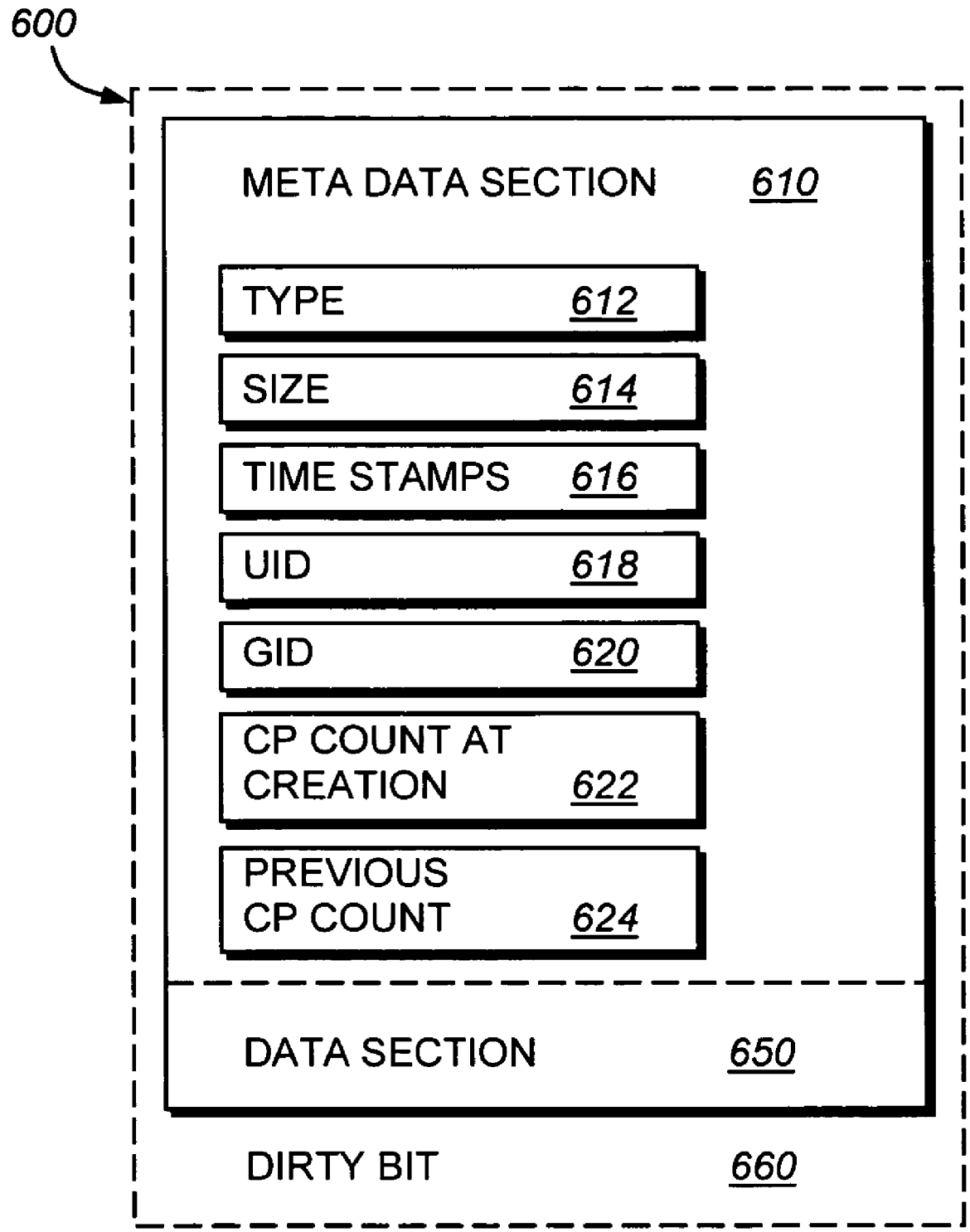
FIG. 6 is a schematic block diagram of an inode in accordance with an embodiment of the present invention.

In the illustrative embodiment, a file (or other data container) is represented in the write-anywhere file system as an inode data structure adapted for storage on the disks 430. FIG. 6 is a schematic block diagram of an inode 600, which preferably includes a metadata section 610 and a data section 650. The information stored in the metadata section 610 of each inode 600 describes the file and, as such, includes the type (e.g., regular, directory, virtual disk) 612 of file, the size 614 of the file, time stamps (e.g., access and/or modification) 616 for the file, ownership, i.e., user identifier (UID 618) and group ID (GID 620), of the file, a consistency point (CP) count at creation field 622 and a previous consistency point count field 624. The contents of the data section 650 of each inode, however, may be interpreted differently depending upon the type of file (inode) defined within the type field 612. For example, the data section 650 of a directory inode contains metadata controlled by the file system, whereas the data section of a regular inode contains file system data. In this latter case, the data section 650 may include a representation of the data associated with the file.

The CP count at creation field 622 identifies the CP count at which this particular version of the inode was generated. The previous CP count field 624 identifies the consistency point count at which the previous version of these inode was stored to disk. In the illustrative embodiment, each CP is identified with a unique CP number that is generated by a monotonically increasing CP counter. In alternate embodiments, the CP count may be generated using other techniques to provide each CP with a unique identifier. These fields 622, 624 may be utilized to quickly determine when a particular data container represented by the inode was modified; this is advantageous since a storage system may retain tens of thousands of checkpoints. For example, if the current CP counter is 1000, a particular inode may have a CP count at creation field 622 set to a value of 800 and a previous CP count field 624 set to 700, which signifies that this inode was created during CP number 800 and that the inode was previously modified during CP number 700. In a write anywhere file system, any time an inode is modified, a new copy is written to disk. At such time, i.e., during inode write allocation, these fields 622, 624 are up-dated.

The data section 650 of a regular on-disk inode may include file system data or pointers, the latter referencing 4 KB data blocks on disk used to store the file system data. Each pointer is preferably a logical vbn to facilitate efficiency among the file system and the RAID system 540 when accessing the data on disks. Given the restricted size (e.g., 128 bytes) of the inode, file system data having a size that is less than or equal to 64 bytes is represented, in its entirety, within the data section of that inode. However, if the file system data is greater than 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 650 of the inode (e.g., a second level inode) references an indirect block (e.g., a first level block) that contains 1024 pointers, each of which references a 4 KB data block on disk. For file system data having a size greater than 64 MB, each pointer in the data section 650 of the inode (e.g., a third level inode) references a double-indirect block (e.g., a second level block) that contains 1024 pointers, each referencing an indirect (e.g., a first level) block. The indirect block, in turn, contains 1024 pointers, each of which references a 4 KB data block on disk. When accessing a file, each block of the file may be loaded from disk 430 into the buffer cache 470.

When an on-disk inode (or block) is loaded from disk 430 into buffer cache 470, its corresponding in core structure embeds the on-disk structure. For example, the dotted line surrounding the inode 600 indicates the in core representation of the on-disk inode structure. The in core structure is a block of memory that stores the on-disk structure plus additional information needed to manage data in the memory (but not on disk). The additional information may include, e.g., a "dirty" bit 660. After data in the inode (or block) is updated/modified as instructed by, e.g., a write operation, the modified data is marked "dirty" using the dirty bit 660 so that the inode (block) can be subsequently "flushed" (stored) to disk. The in core and on-disk format structures of the WAFL file system, including the inodes and inode file, are disclosed and described in the previously incorporated U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

Figure 7:
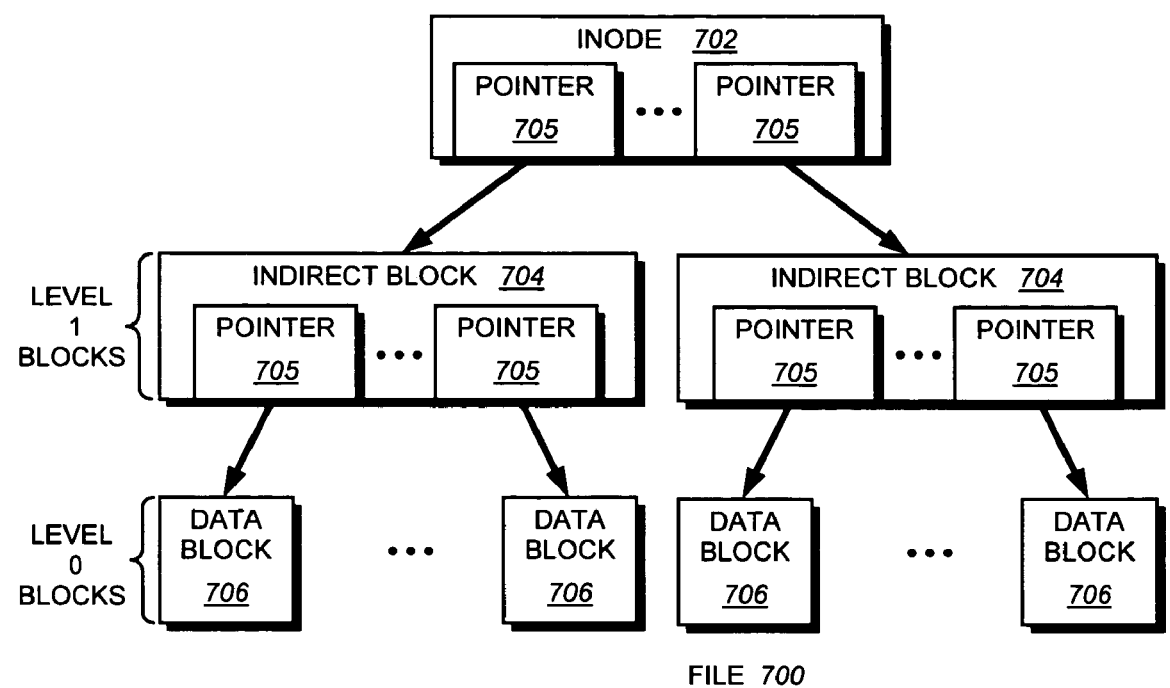
FIG. 7 is a schematic block diagram of a buffer tree of a file in accordance with an embodiment of the present invention.

FIG. 7 is a schematic block diagram of a buffer tree of a file that may be advantageously used with the present invention. The buffer tree is an internal representation of blocks for a file (e.g., file 700) loaded into the buffer cache 470 and maintained by the write-anywhere file system 580. A root (top-level) inode 702, such as an embedded inode, references indirect (e.g., level 1) blocks 704. The indirect blocks (and inode) contain pointers 705 that ultimately reference data blocks 706 used to store the actual data of file. That is, the data of file 700 are contained in data blocks and the locations of these blocks are stored in the indirect blocks of the file. Each level 1 indirect block 704 may contain pointers to as many as 1024 data blocks. According to the "write anywhere" nature of the file system, these blocks may be located anywhere on the disks 430.

An aggregate is a physical volume comprising one or more groups of disks, such as RAID groups, underlying one or more flexible volumes of the storage system. The aggregate has its own physical volume block number (pvbn) space and maintains metadata, such as block allocation bitmap structures, within that pvbn space. Each flexible volume has its own virtual volume block number (vvbn) space and maintains metadata, such as block allocation bitmap structures, within that vvbn space.

In the illustrative embodiment, pvbns are used as block pointers within buffer trees of files (such as file 700) stored in a flexible volume. This illustrative "hybrid" flexible volume embodiment involves the insertion of only the pvbn in a parent indirect block (e.g., inode or indirect block). Use of pvbns avoids latency associated with translations from vvbns-to-pvbns, e.g., when servicing file system (such as NFS, CIFS) requests. On a read path of a logical volume, a "logical" volume (vol) info block has one or more pointers that reference one or more fsinfo blocks, each of which, in turn, "points to" an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 500.

In an alternate "dual vbn hybrid" flexible volume embodiment, both the pvbn and vvbn are inserted in the parent indirect (e.g., level 1) blocks in the buffer tree of a file, such as file 700. Here, the use of pvbns as block pointers in the indirect blocks provides efficiencies in the read paths, while the use of vvbn block pointers provide efficient access to required metadata. That is, when freeing a block of a file, the parent indirect block in the file contains readily available vvbn block pointers, which avoids the latency associated with accessing an owner map (described herein) to perform pvbn-to-vvbn translations; yet, on the read path, the pvbn is available. A disadvantage of this dual vbn variant is the increased size of indirection data (metadata) stored in each file.

Figure 8:
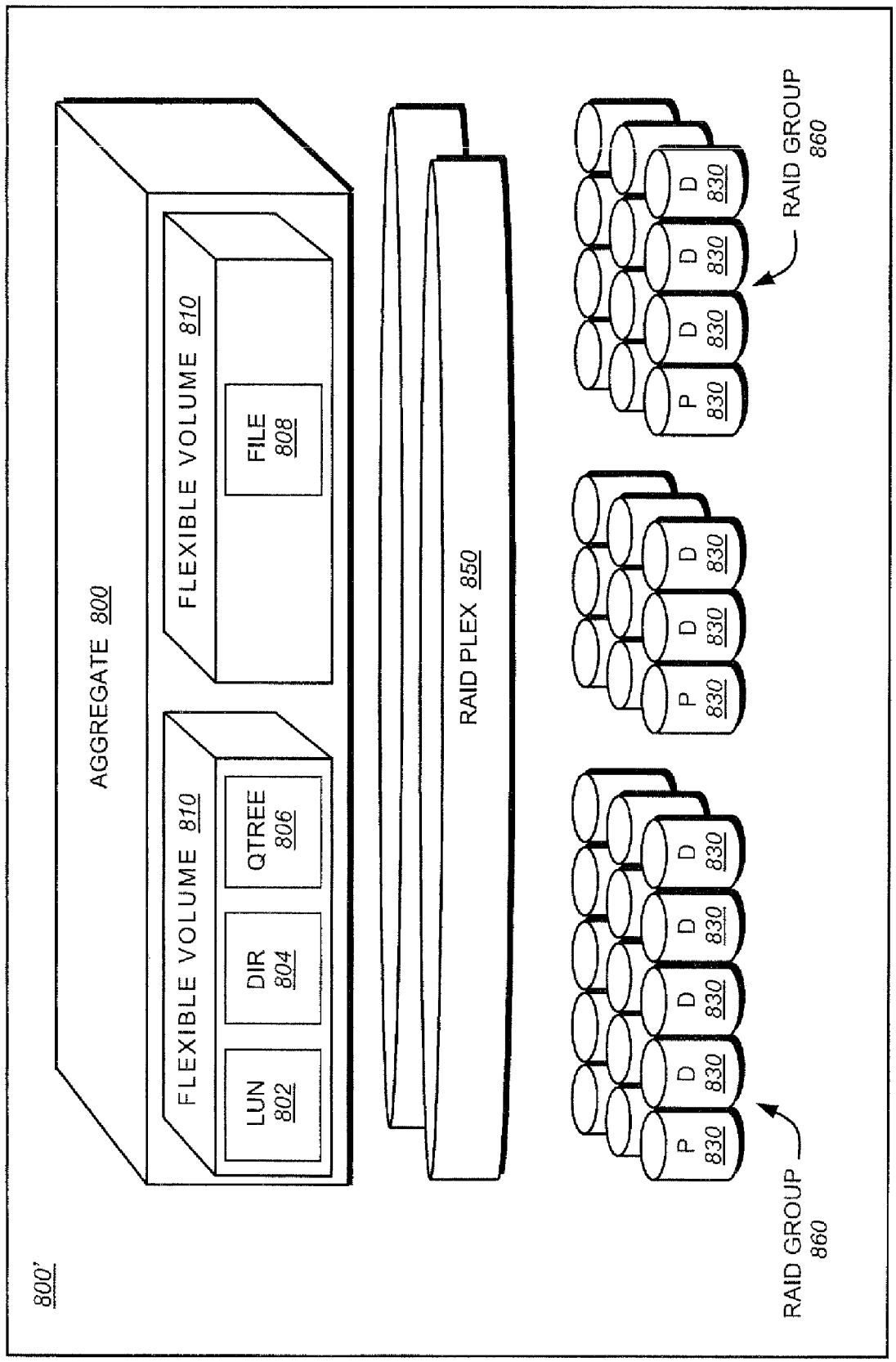
FIG. 8 is a schematic block diagram of an embodiment of an aggregate in accordance with an embodiment of the present invention.

FIG. 8 is a schematic block diagram of an embodiment of a storage environment 800' having an aggregate 800 that may be advantageously used with the present invention. Luns (blocks) 802, directories 804, qtrees 806 and files 808 may be contained within flexible volume 810 that, in turn, are contained within the aggregate 800. The aggregate 800 is illustratively layered on top of the RAID system, which is represented by at least one RAID plex 850 (depending upon whether the storage configuration is mirrored), wherein each plex 850 comprises at least one RAID group 860. Each RAID group further comprises a plurality of disks 830, e.g., one or more data (D) disks and at least one (P) parity disk.

Whereas the aggregate 800 is analogous to a physical volume of a conventional storage system, a flexible volume is analogous to a file within that physical volume. That is, the aggregate 800 may include one or more files, wherein each file contains a flexible volume 810 and wherein the sum of the storage space consumed by the flexible volume is physically smaller than (or equal to) the size of the overall physical volume. The aggregate utilizes a "physical" pvbn space that defines a storage space of blocks provided by the disks of the physical volume, while each embedded flexible volume (within a file) utilizes a "logical" vvbn space to organize those blocks, e.g., as files. Each vvbn space is an independent set of numbers that corresponds to locations within the file, which locations are then translated to dbns on disks. Since the flexible volume 810 is also a logical volume, it has its own block allocation structures (e.g., active, space and summary maps) in its vvbn space.

Figure 9:
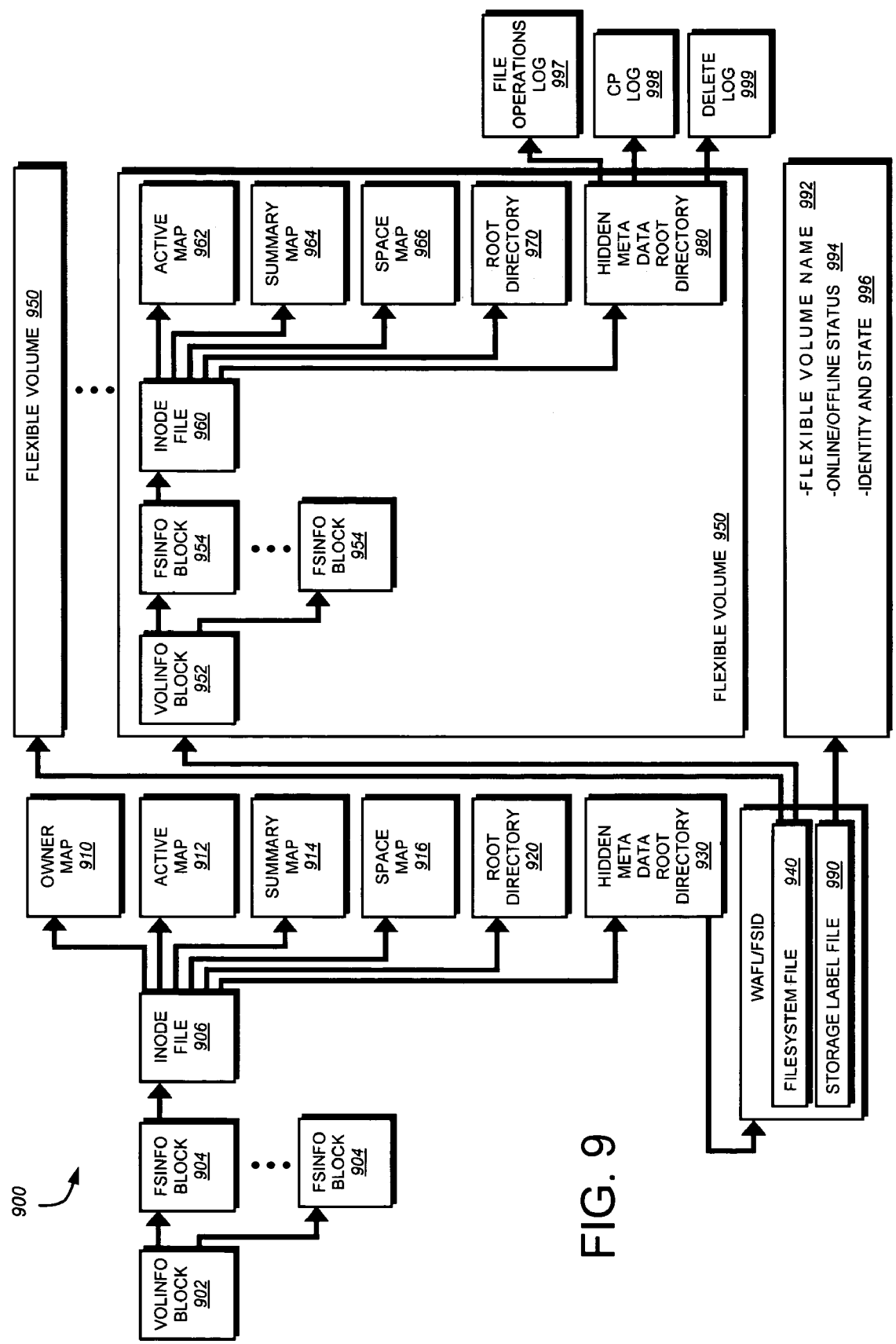
FIG. 9 is a schematic block diagram of an on-disk representation of an aggregate in accordance with an embodiment of the present invention.

FIG. 9 is a schematic block diagram of an on-disk representation of an aggregate 900. The storage operating system 500, e.g., the RAID system 540, assembles a physical volume of pvbns to create the aggregate 900, with pvbns 1 and 2 comprising a "physical" volinfo block 902 for the aggregate. Broadly stated, a volinfo block stores volume-level information, as well as provides support for large numbers of snapshots. To that end, the volinfo block 902 contains block pointers to fsinfo blocks 904, each of which may represent a snapshot of the aggregate. Each fsinfo block 904 includes a block pointer to an inode file 906 that contains inodes of a plurality of files, including an owner map 910, an active map 912, a summary map 914 and a space map 916, as well as other special metadata files. The inode file 906 further includes a root directory 920 and a "hidden" metadata root directory 930, the latter of which includes a namespace having files related to a flexible volume in which users cannot "see" the files. The hidden metadata root directory also includes a WAFL/fsid/directory structure, as described herein, which contains a filesystem file 940 and storage label file 990. Note that root directory 920 in the aggregate is empty; all files related to the aggregate are organized within the hidden metadata root directory 930.

The filesystem file 940 includes block pointers that reference various file systems embodied as flexible volumes 950. The aggregate 900 maintains these flexible volumes 950 at special reserved inode numbers. Each flexible volume 950 also has special reserved inode numbers within its flexible volume space that are used for, among other things, the block allocation bitmap structures. As noted, the block allocation bitmap structures, e.g., active map 962, summary map 964 and space map 966, are located in each flexible volume.

Specifically, each flexible volume 950 has the same inode file structure/content as the aggregate, with the exception that there is no owner map and no WAFL/fsid/filesystem file, storage label file directory structure in a hidden metadata root directory 980. To that end, each flexible volume 950 has a volinfo block 952 that points to one or more fsinfo blocks 954, each of which may represent a snapshot of the flexible volume. Each fsinfo block, in turn, points to an inode file 960 that, as noted, has the same inode structure/content as the aggregate with the exceptions noted above. Each flexible volume 950 has its own inode file 960 and distinct inode space with corresponding inode numbers, as well as its own root (fsid) directory 970 and subdirectories of files that can be exported separately from other flexible volume.

The storage label file 990 contained within the hidden metadata root directory 930 of the aggregate is a small file that functions as an analog to a conventional raid label. A raid label includes "physical" information about the storage system, such as the volume name; that information is loaded into the storage label file 990. Illustratively, the storage label file 990 includes the name 992 of the associated flexible volume 950, the online/offline status 994 of the flexible volume, and other identity and state information 996 of the associated flexible volume (whether it is in the process of being created or destroyed).

A container file is a file in the aggregate that contains all blocks used by a flexible volume. The container file is an internal (to the aggregate) feature that supports a flexible volume; illustratively, there is one container file per flexible volume. The container file is a hidden file (not accessible to a user) in the aggregate that holds every block in use by the flexible volume. As noted, the aggregate includes an illustrative hidden metadata root directory that contains subdirectories of flexible volume:

WAFL/fsid/filesystem file, storage label file

Specifically, a "physical" file system (WAFL) directory includes a subdirectory for each flexible volume in the aggregate, with the name of subdirectory being a file system identifier (fsid) of the flexible volume. Each fsid subdirectory (flexible volume) has at least two files, the filesystem file 940 and the storage label file 990. The filesystem file is a large sparse file that contains all blocks owned by a flexible volume and, as such, is referred to as the container file for the flexible volume.

Also within the hidden metadata root directory 980 are illustratively a consistency point log 998, a delete log 999 and a file operations log 997. The consistency point log 998 and delete log 999 are utilized in accordance with a first embodiment of the present invention that utilizes checkpoints to provide continuous data protection. The use of such consistency point and delete logs 998, 999 are described further below. The file operations log 997 is utilized in accordance with a second embodiment the present invention wherein each received file operation stored within the NVLog 431 is committed to the file operations log 997 during a CP to thereby enable the reconstruction of the ordering of operations received by the storage system.

D. Continuous Data Protection Using Checkpoints

The present invention provides a technique for continuous data protection (CDP) using checkpointing in a write anywhere file system. The write anywhere file system is modified so that during a consistency point (CP) a checkpoint is created by retaining blocks that were freed during write allocation to thereby prevent the blocks from being reclaimed (and reused) by the file system. The freed blocks are illustratively retained in a delete log comprising a container file configured to store each of the retained blocks in the file system. It should be noted that this is an illustrative implementation and, in alternate embodiments, the delete log may be implemented using other forms of data structures.

Blocks are added to the delete log by inserting the appropriate virtual block number (vbn) or virtual volume block number (vvbn) pointers of the freed blocks into an inode buffer tree of the delete log such that the newly added blocks are appended to the end of the delete log. Thus, each block of the delete log is a retained block that was previously freed during a CP. By indexing into the delete log, the file system can retrieve data from any retained block to thereby reconstruct the state of the file system as of a particular CP.

Additionally, during each CP, an entry in a CP log is generated that contains an offset identifying the starting location within the delete log of the blocks that were added since the start of the CP. The file system may subsequently access an entry of the CP log to identify the starting location of the blocks associated with a particular CP and thereby locate any of the blocks within the delete log.

Furthermore, the file system implements a set of administrator defined retention policies. An administrator may set a retention period for blocks retained in the delete log based on one or more thresholds, such as time, number of CPs retained and/or the size (amount) of the container file consumed by the retained checkpoints. When any of the retention thresholds is exceeded, the file system frees blocks associated with CPs until the retained blocks are below the threshold. In alternative embodiments, the file system may free blocks until the retained blocks meet a second threshold value that is illustratively is less than the retention threshold. The blocks freed from the delete log are reclaimed by the file system for reuse during future write allocation. In the illustrative embodiment, the delete log is a embodied as a first-in first-out (FIFO) data structure so that when blocks are freed from the delete log for reclamation, the oldest blocks, i.e., those blocks associated with the CP with the earliest timestamp, are freed first. In alternative embodiments, other techniques, including the ability to free blocks in an arbitrary order may be implemented.

Figure 10:
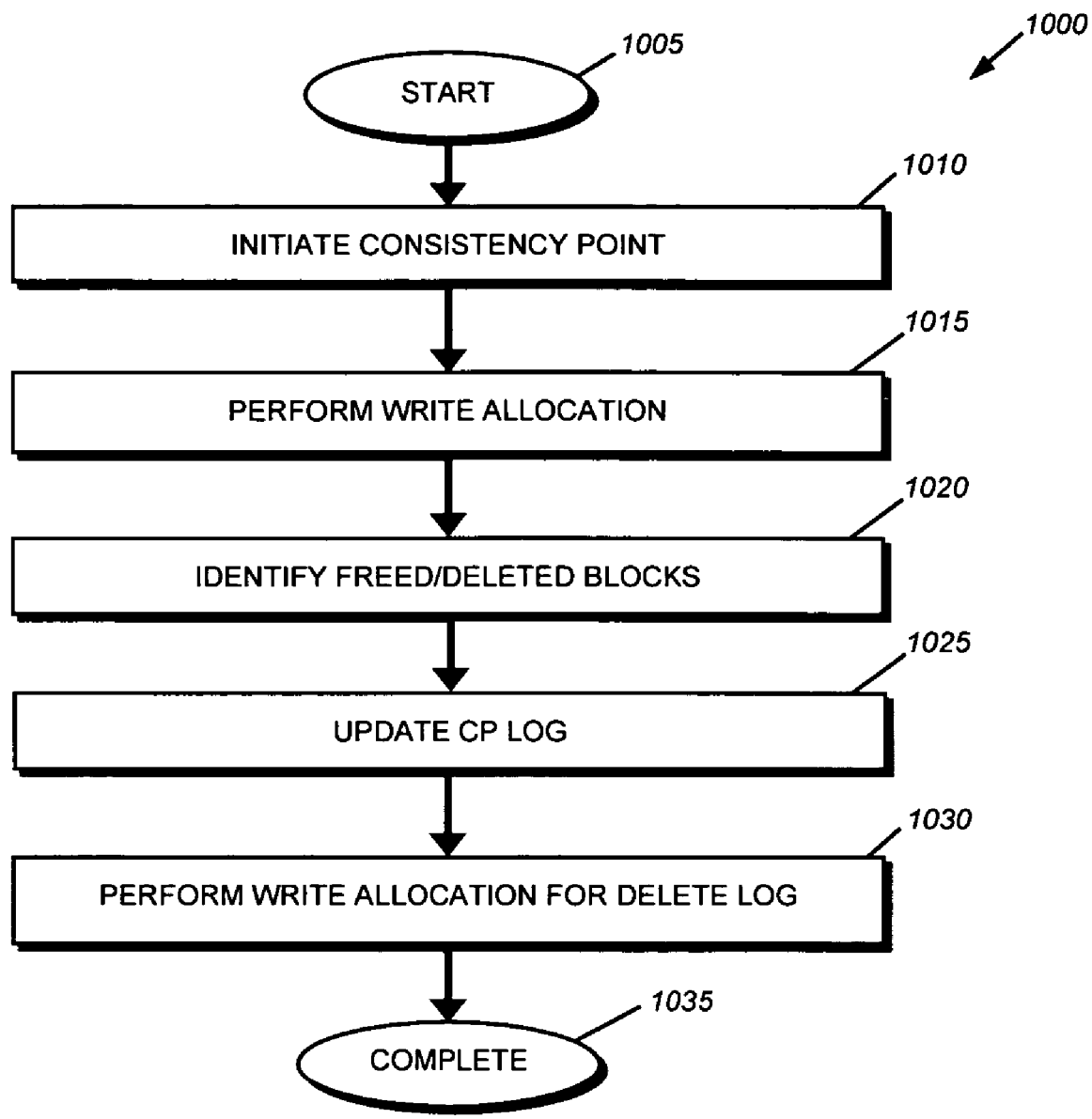
FIG. 10 is a flowchart detailing the steps of a procedure for updating the delete log and consistency point log during a consistency point in accordance with an embodiment of the present invention.

FIG. 10 is a flowchart detailing the steps of a procedure 1000 for creating a checkpoint during a CP in accordance with a first embodiment of the present invention. The procedure 1000 begins in step 1005 and continues to step 1010 where a CP is initiated. The CP may be initiated due to, for example, the expiration of a timer, the filling of in-core memory for storing changes, by an administrator command, etc. During the course of the CP, write allocation is performed in step 1015. Write allocation is described in the above-incorporated U.S. Pat. No. 5,819,292. During the course of write allocation, various volume (or virtual volume) blocks may be freed, due to deletion of a file, a change in data causing the write anywhere file system to rewrite the modified block to a new location, etc.

The file system identifies these freed blocks in step 1020. Illustratively, during write allocation, the file system generates a list of blocks that have been freed. The file system then updates the CP log in step 1025 to identify the starting location of the newly freed blocks within the delete log. The updating of the CP log occurs by, for example, the creation of a new entry 1110 (see FIG. 11) associated with the current CP. Once the CP log has been updated, the file system then performs write allocation for the delete log in step 1030. During write allocation for the delete log, the newly freed blocks are appended to the delete log. Thus, appropriate pointers (vbn/vvbn) are added to the indirect blocks of the delete log to point to the freed blocks. Once the delete log write allocation completes, the N blocks that were freed during this CP are retained within the file system as the last N blocks of the delete log. The procedure 1000 then ends in step 1035.

Figure 11:
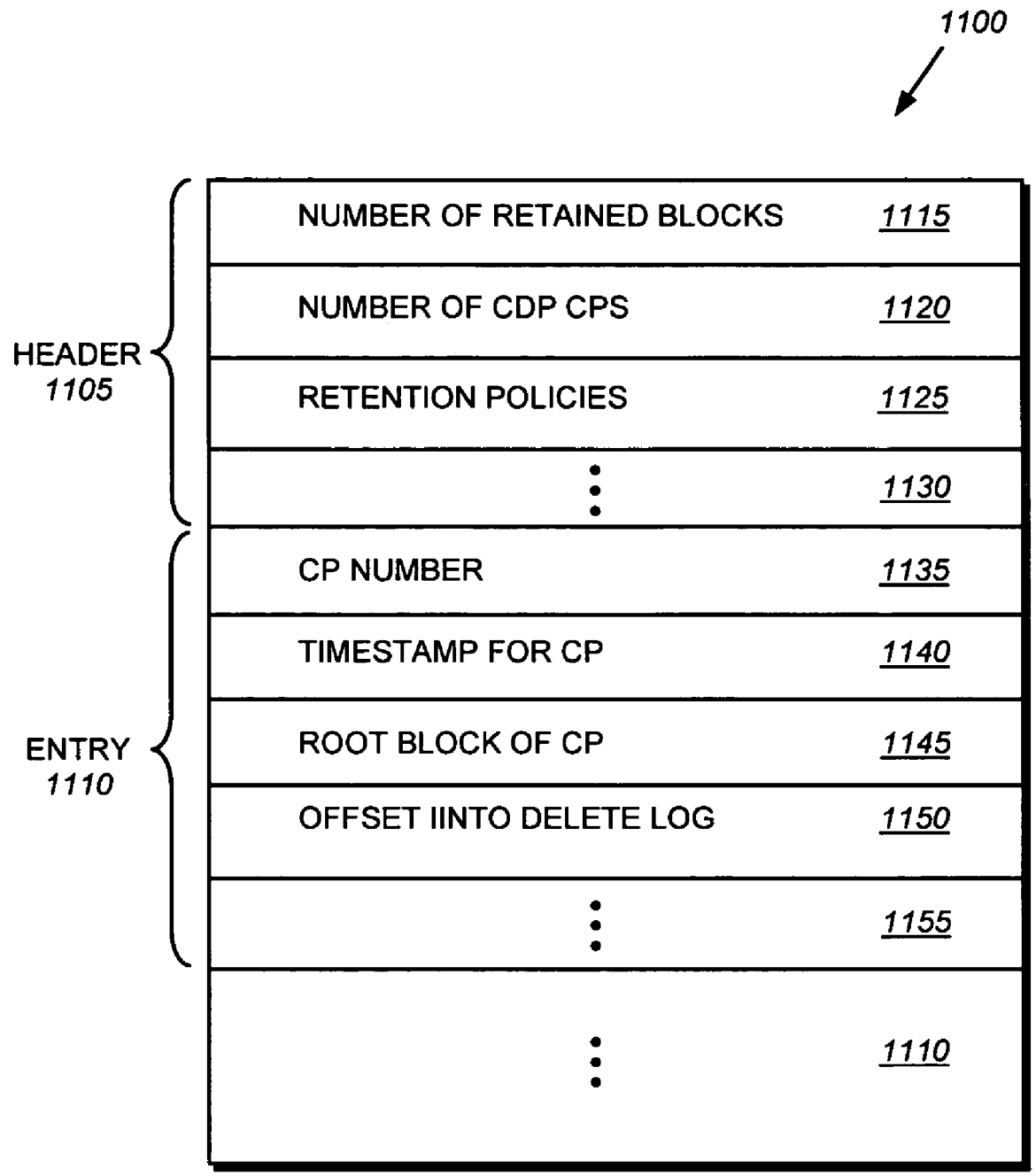
FIG. 11 is a schematic block diagram of a consistency point log in accordance with an embodiment of the present invention.

FIG. 11 is a schematic block diagram of an exemplary CP log 1100 in accordance with an embodiment of the present invention. The CP log 1100 illustratively comprises a header 1105 and one or more entries 1110. The header 1105 includes a number of retained blocks field 1115, a number of CDP CPs field 1120, one or more retention policy fields 1125 and, in alternate embodiments, additional fields 1130. The number of retained blocks field 1115 contains a count of the total number of blocks have been stored within the delete log, i.e., the number of blocks that have been freed but not reclaimed for use by the file system. The number of CPs field 1120 identifies the number of entries 1110 in the CP log 1100 and, thus, identifies the number of CPs stored by the delete log. The retention policy fields 1125 identifies the retention policies for retaining and ultimately freeing for reuse the blocks in the delete log. For example, an administrator may configure the file system so that a set number of CPs are stored. Alternately, the administrator may configure the file system so that checkpoints are stored for a set period of time; as a result, stored checkpoints older than the time (i.e., that exceed the expiry time) are suitable for reallocation. Alternately, the administrator may have set a retention policy that limits the overall space consumed by the retained blocks. For example, an administrator may configure a retention policy so that the retained blocks do not occupy more than a predetermined percentage of the overall space of a volume.

Each entry 1110 is associated with a particular CP and includes a number of fields such as, for example, a CP number field 1135, a timestamp field 1140, a root block field 1145, an offset into the delete log field 1150 and, in alternate embodiments, additional fields 1155. The CP number field 1135 identifies the CP count associated with this CP. Illustratively, CPs are numbered using a monotonically increasing number. The timestamp 1140 identifies a timestamp associated with this CP. The timestamp field 1140 may be utilized by an administrator for ease-of-use in identifying a particular CP desired by the administrator for certain operations, i.e., by identifying a CP by date/time rather than by CP count. The root block field 1145 contains a pointer to the root block, i.e., the fsinfo block of the file system at the conclusion of the CP. The offset into the delete log field 1150 identifies the file block number (fbn) of the first block that was added to the delete log during this CP.

Figure 12:
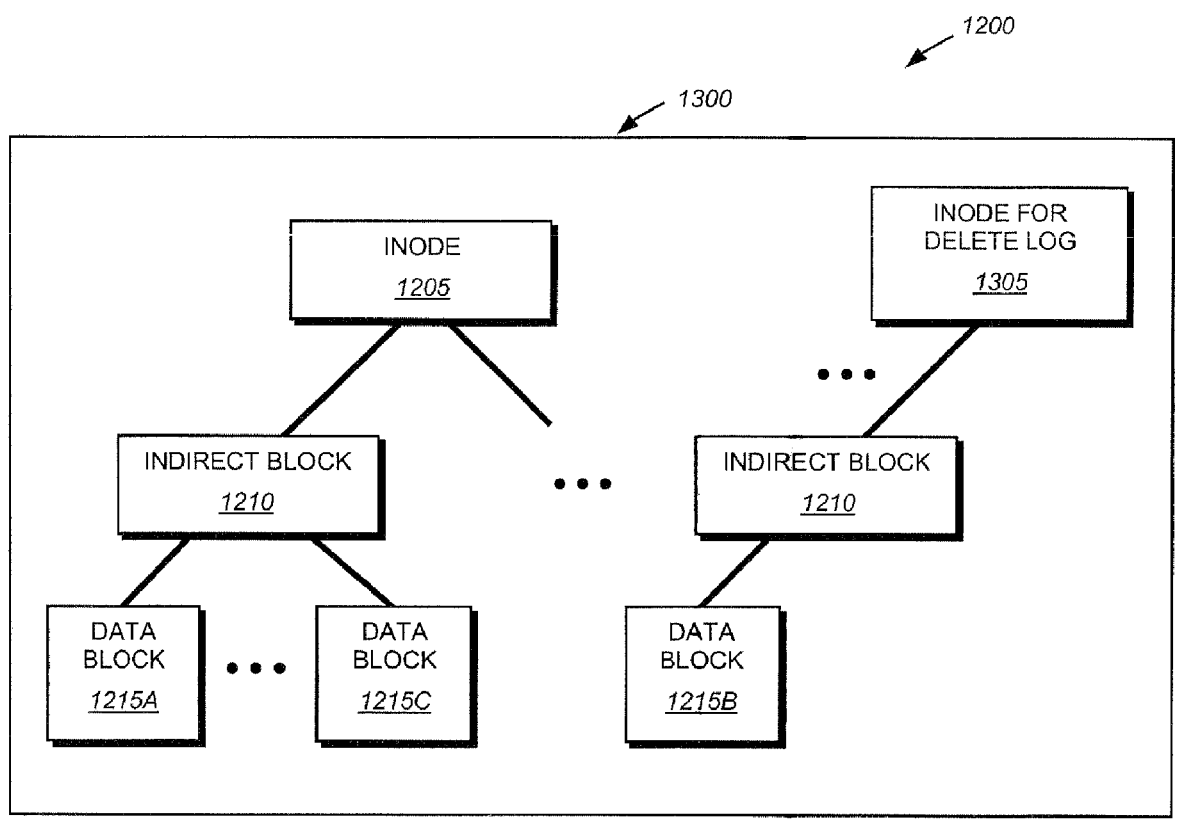
FIG. 12 is a schematic block diagram of an inode buffer tree in accordance with an embodiment of the present invention.
Figure 13:
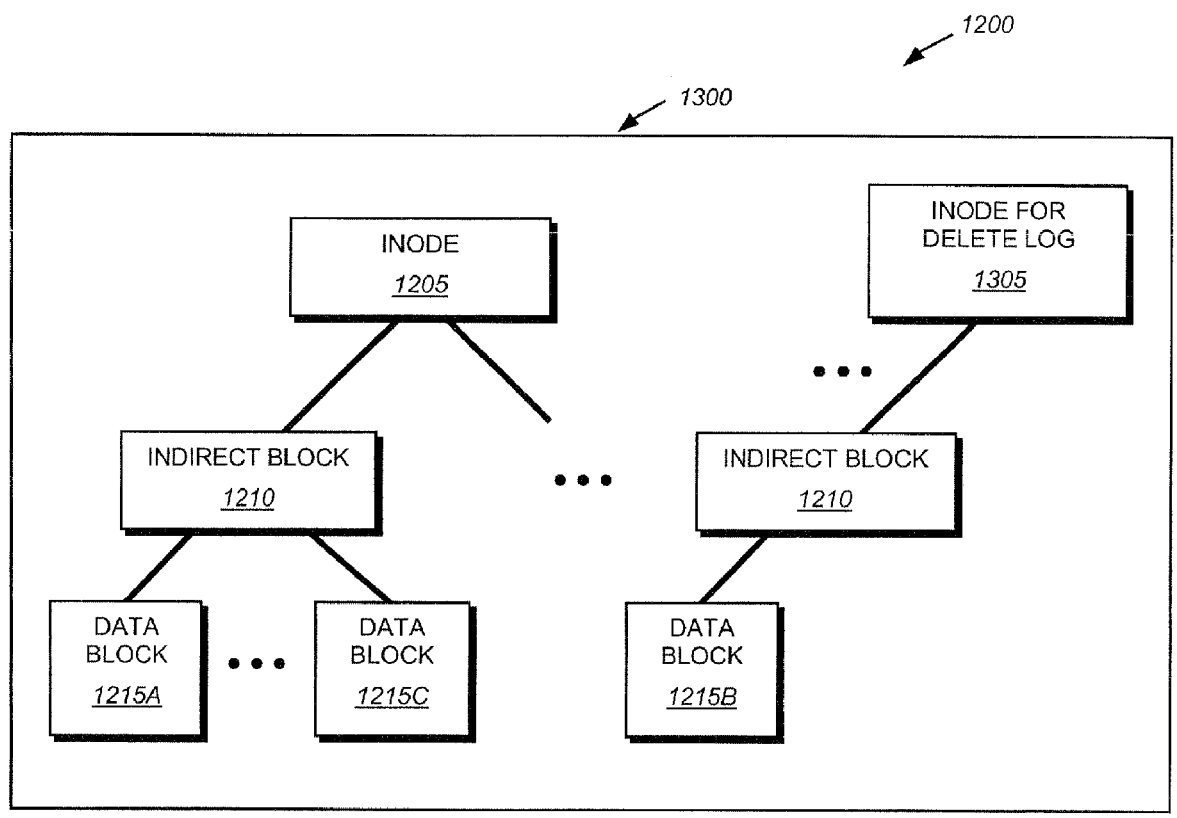
FIG. 13 is a schematic block diagram of an inode buffer tree and delete log buffer tree in accordance with an embodiment of the present invention.

FIG. 12 is a schematic block diagram of an exemplary inode buffer tree 1200 in accordance with an embodiment of the present invention. The inode buffer tree 1200 includes an inode 1205 that comprises of a set of pointers including a pointer to indirect block 1210. The indirect block 1210 includes pointers to a plurality of data blocks 1215 A, B. It should be noted that the three-level buffer tree is shown for exemplary purposes only and that any number of indirect blocks may be utilized in accordance with various alternate embodiments. Specifically, the number of indirect blocks is tied to the size of the particular data container as described above. During the course of write allocation in accordance with the present invention, assume that the contents of data block 1215B are modified so that during the next CP, a new data block containing the modified data is written to disk, i.e., data block 1215C of inode buffer tree 1300 of FIG. 13. Similarly, a new indirect block 1310 is written to disk, the new block 1310 containing a new pointer to data block 1215C. Thus, the modified data container comprises an inode 1205 containing a pointer to an indirect block 1310 which points to data blocks 1215 A, C. In accordance with teachings of the present invention, the original data block 1215B is retained within the delete log. Illustratively, the original indirect block 1210 and data block 1215 are appended to the delete log. Thus, the inode for the delete log 1305 includes a pointer to the indirect block 1210, which retains its pointer to the data block 1215 B. In this way, the delete log comprises a container file of the freed blocks of the file system.

Figure 14:
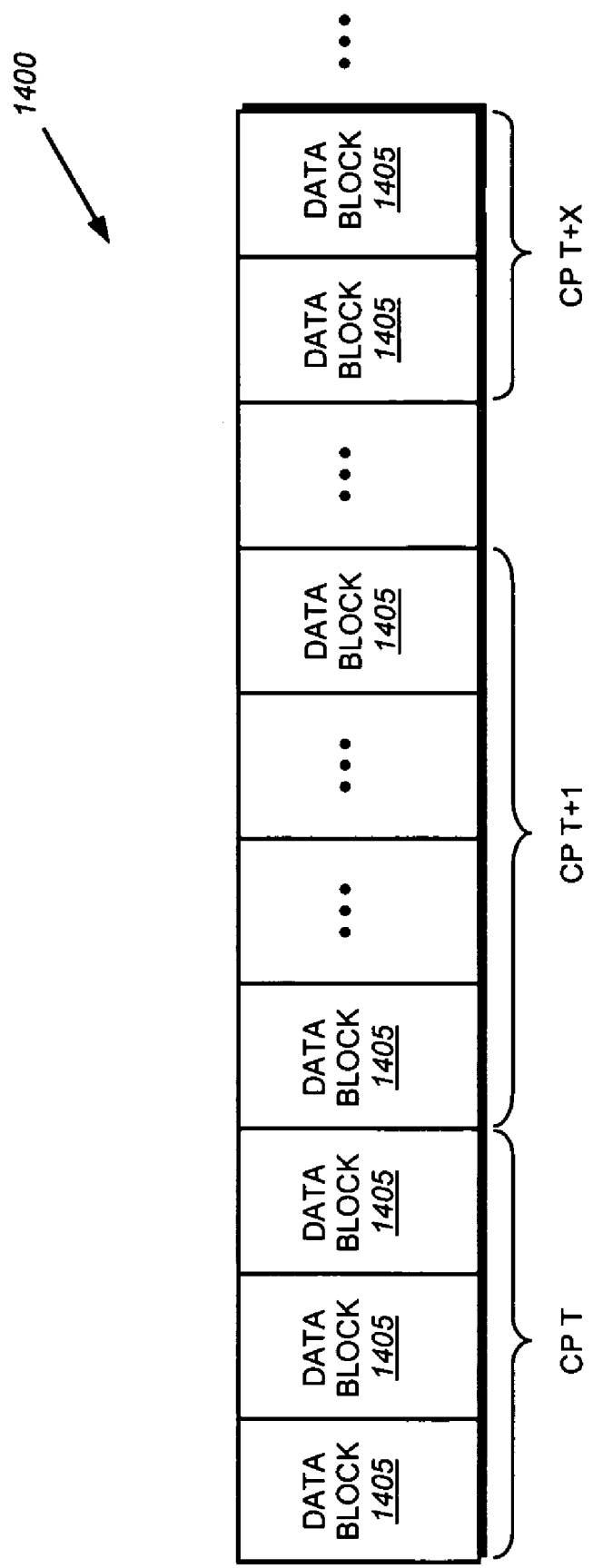
FIG. 14 is a schematic block diagram illustrating the contents of the delete log in accordance with an embodiment of the present invention.

FIG. 14 is a schematic block diagram of an exemplary delete log 1400 showing the association of individual data blocks retained therein. Thus, for example, three data blocks 1405 are associated with a CP at time T, whereas a first set of data blocks 1405 is associated with CP at time T+1 and a second set of data blocks 1405 is associated with a CP at time T+X. If a retention policy threshold is exceeded, e.g., the CP at time T is older than the retention period, the file system reclaims the blocks associated with those CPs that are beyond the retention threshold. In this example, the three blocks 1405 associated with CP T would be freed for reuse by the file system.

Figure 15:
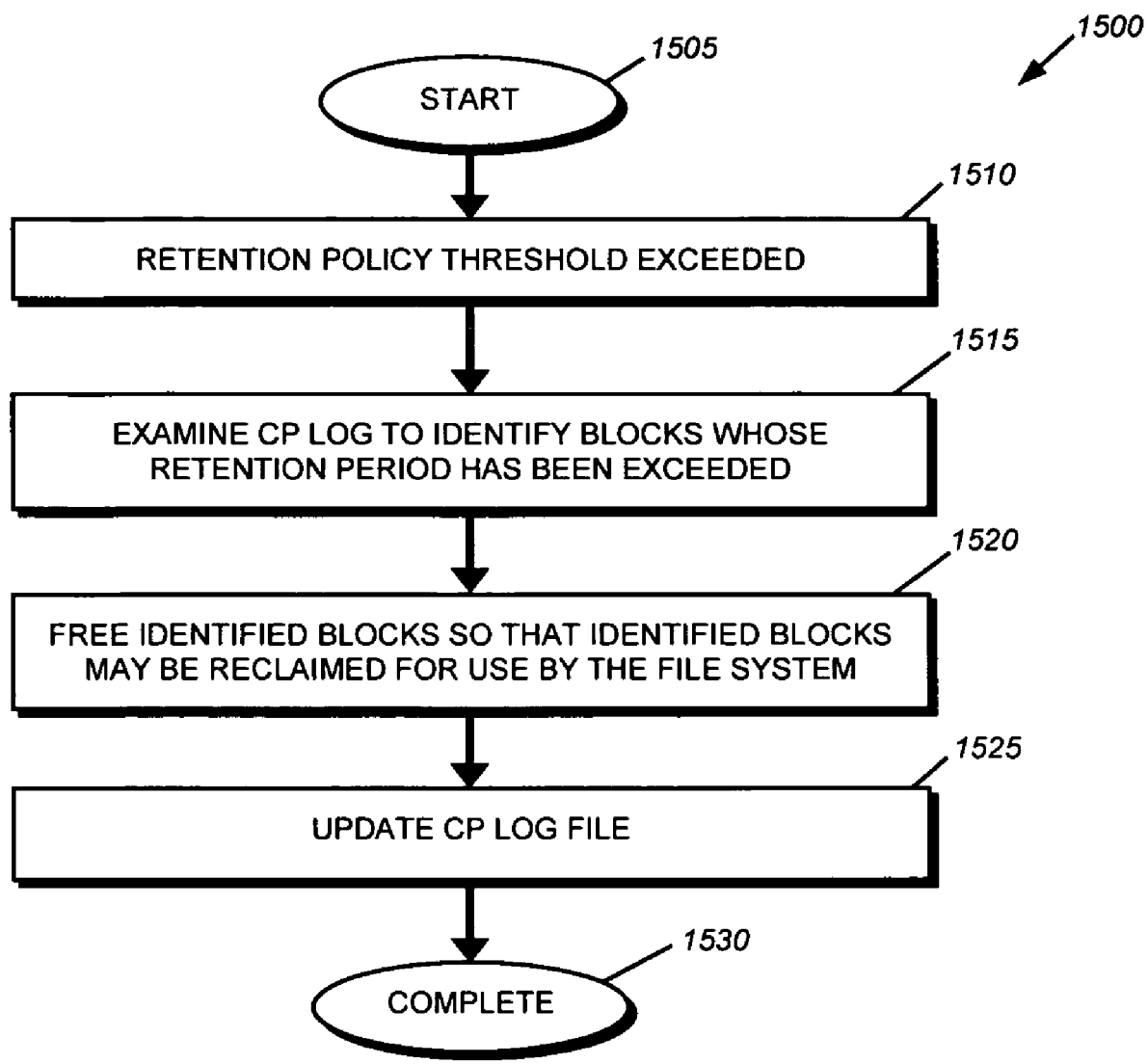
FIG. 15 is a flowchart detailing the steps of a procedure for implementing retention policies in accordance with an embodiment of the present invention.

FIG. 15 is a flowchart detailing the steps of a procedure 1500 for reclaiming blocks for use by the file system in accordance with an embodiment of the present invention. The procedure 1500 begins in step 1505 and continues to step 1510 where one or more retention policy thresholds are exceeded. As noted above, these thresholds may be based on time, number of checkpoints retained, space utilized by the checkpoints, etc. Illustratively, the file system monitors the various retention policy thresholds at regular intervals. For example, a retention policy may be set to generate a checkpoint at each CP but to only retain every $10^{th}$ checkpoint after a user-configured time period. Additionally, in alternate embodiments, the consistency point log may be constructed to enable the non-FIFO deletion methodologies. As such, the exemplary retention policies described herein should be taken as examples only and should not limit the scope of the present invention.

Additionally, in an alternate embodiment, such a user interface may enable an administrator to identify a particular checkpoint that is to be locked, i.e., that is never deleted until explicitly deleted by a user command. Such a command may enable certain checkpoints to be persistently stored even though they violate (or exceed) retention policy thresholds.

Should any of the thresholds be exceeded, the file system, in step 1515, examines the CP log to identify blocks whose retention periods have been exceeded. This may be performed by, for example, examining the CP log beginning with the oldest CPs until such time as the file system reaches the point in the log where CPs are no longer exceeding the retention threshold. The identified blocks are then freed in step 1520 so that they may be reclaimed for use by the file system. Freeing of identified blocks may occur by marking the block as free so that the file system reuses the blocks in future write allocation operations. The CP log is updated in step 1525 to reflect the fact that the freed blocks are no longer associated with a CP. The procedure 1500 then completes in step 1530.

By utilizing the present invention, each checkpoint becomes a stored version of the file system that is accessible by users. The user interfaces are modified to permit users or applications to specify any point in time for version access. This allows users to access a version without knowing the exact creation time of a particular checkpoint. If the specified time does not match the time of any checkpoint, the immediately preceding checkpoint, i.e., the checkpoint created previous to the specified time, is utilized.

The time-based access interfaces allow for accessing both file and directory versions that are retained in the checkpoints. Specifically, file and directory versions may be accessed through a special directory similar to the .snapshot directory available in Data ONTAP®. It is worth noting that straightforward .snapshot directory extension would not be effectively scalable as there could possibly be millions of checkpoints that may confuse and/or frustrate users.

Instead, checkpoints may be accesses through a special directory.checkpoint@yyyymmdd.hhmmss or .checkpoint@checkpoint_number. Such special directories may be hidden from normal user operations; however, the special directories may be utilized for browsing the checkpoints. This format permits per second granularity, although in alternate embodiments, the timestamp may be modified to provide sub-second (or any other time period) granularity.

When searching a version based on a specified timestamp, checkpoint records in the checkpoint log are examined to identify the corresponding checkpoint. As mentioned earlier, each checkpoint record contains a timestamp to record the checkpoint creation time. As the checkpoint records are ordered from the oldest to the youngest, a binary search may be easily performed to locate the matching checkpoint.

The above interface works with pathname based protocol such as CIFS without requiring additional changes. However, the NFS protocol utilizes file handles for accessing data and file handles need to be modified to specify the access to an earlier point in time. To utilize NFS, a flag is illustratively added to the file handle to identify whether the file handle is for current data or for data from a previous point in time. If the file handle is for a previous point in time, then the inode generation number in the file handle is overloaded to reference the file version number, which is illustratively the checkpoint number.

E. Continuous Data Protection Using File Operations Logging

In a second embodiment of the present invention, each file operation received is logged in the NVLog and later maintained in a persistent file operations log to thereby provide intra-checkpoint granularity of continuous data protection. For example, assume that two write operations are received by the storage system and that each write operation is directed to the same area of a given file. The first received operation will complete and then the second one will overwrite the previously written data. If both operations are received and processed in the time between two checkpoints, only the result of the second operation will be stored within the consistency point log at the conclusion of the checkpoint. No persistent record of the first operation is retained. By utilizing the teachings of the second embodiment, each individual file operation may be logged to therefore provide greater granularity. Such granularity may be needed for computer forensic situations, debugging operations, regulatory compliance environments, etc.

In accordance with the second embodiment, each operation received by the storage system is logged within the NVLog 431. Such logging is performed by the storage system to enable a number of file system operations to be aggregated and written to disk during the course of a single consistency point. However, in accordance with the second embodiment, each of the received operations, and not the final end state of the file system at the time of the CP, are written to disk in the form of a file operations log 997. Thus, by examining entries within the file operations log 997, a determination may be made as to the ordering of operations received by the storage system and the state of the file system at any point in time, even between checkpoints.

Figure 16:
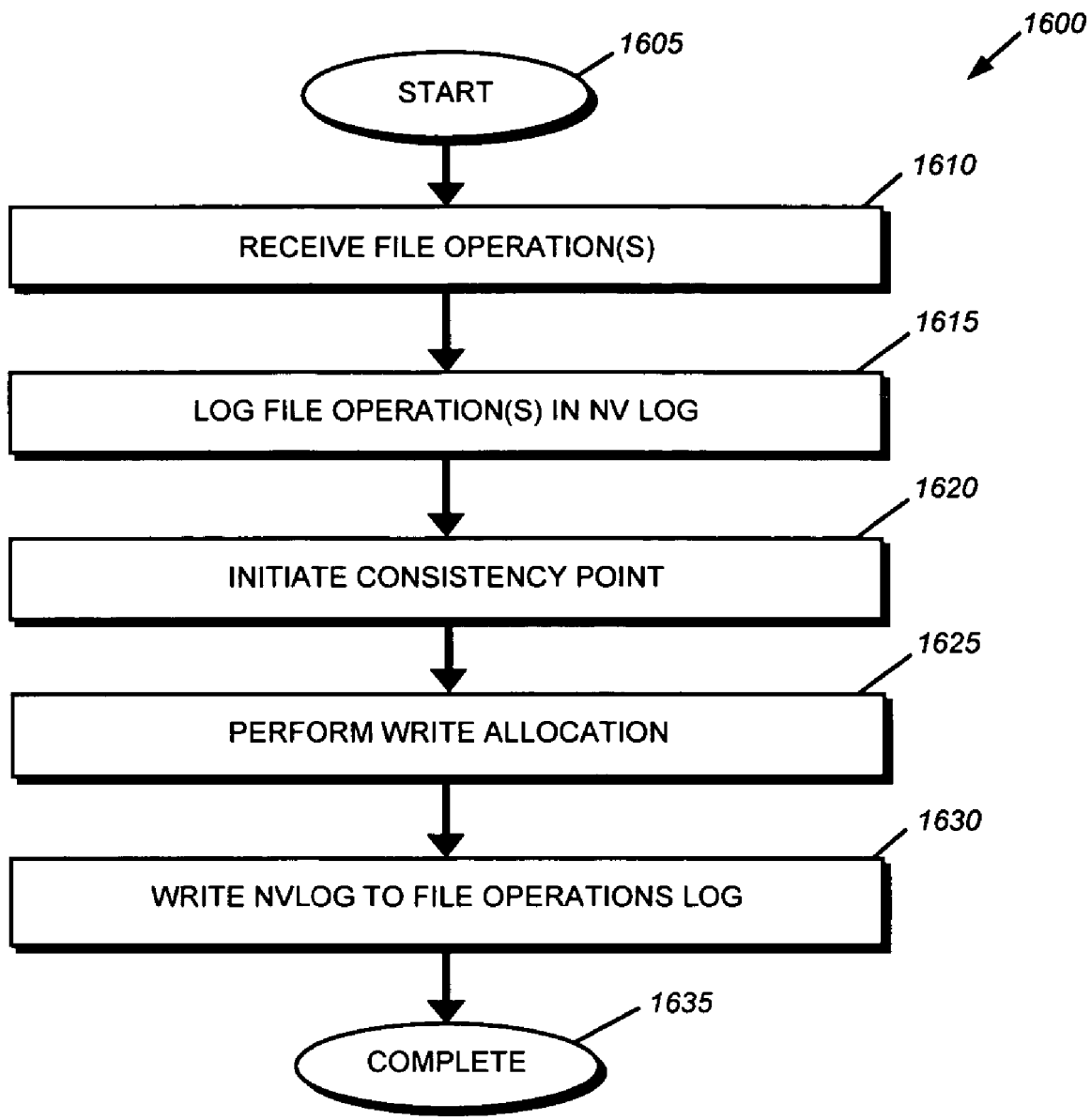
FIG. 16 is a flowchart detailing the steps of a procedure for logging file operations in accordance with an embodiment of the present invention.

FIG. 16 is a flowchart detailing the steps of a procedure 1600 for providing continuous data protection using file operation logging in accordance with a second embodiment of the present invention. The procedure 1600 begins in step 1605 and continues to step 1610 where the storage system receives one or more file operations. Such operations are typically received from clients of the storage system. In response, the file operations are logged in the NVLog 431 in step 1615. At some later point in time, a CP is initiated in step 1620. During the course of the CP, write allocation is performed in step 1625. Additionally, during the consistency point, the NVLog 431 is written to the file operations log 431 in step 1630. By writing the NVLog 431 to the file operations log, the ordering of operations received by the storage system is persistently stored for later analysis. The procedure 1600 then completes in step 1635. In alternate embodiments, if checkpoints are enabled, the storage system may identify duplicate data blocks between the file operations log and the consistency point log during execution of procedures 1400 and 1600. In such cases, the storage system may insert into the file operations log a pointer to the appropriate block being written or maintained within the CP log. This ability is not possible without the ability to save earlier checkpoints. If checkpoints are not saved, pointers may reference incorrect data blocks as the data blocks may have been modified by later file system operations. This optimization removes the need to write data to disk twice and reduces the amount of space required for the various log files, thereby reducing the chance of retention policy thresholds being exceeded and thereby increasing the number of checkpoints that may be retained before exceeding a retention policy threshold.

It should be noted that the present invention works both locally and remotely using, e.g., a synchronous stream of data changes sent to the remote system. By locally it is meant that continuous data protection can be provided without requiring additional hardware beyond the storage system for which CDP is being provided. Remote CDP would utilize, e.g., copying of checkpoints from a source to a remote system.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software (including a computer-readable medium having program instructions executing on a computer), hardware, firmware, or a combination thereof. Additionally, while this description has been written in terms of a file system, the present invention may be utilized with non-file system storage, such as a luns and/or other block based storage. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for providing continuous data protection in a file system, comprising:

generating one or more persistent consistency point images (PCPIs) of the file system, wherein each PCPI shares one or more file system blocks with at least one other generated PCPI;

executing a consistency point during which data changes contained in memory are flushed to persistent storage and one or more data blocks on the persistent storage are freed;

performing write allocation of the freed blocks to a delete log to prevent the freed blocks from being reclaimed for reuse by the file system;

allowing any of the freed blocks that are subsequently freed from the delete log to be reclaimed by the file system for reuse during future write allocation;

updating a consistency point log to list blocks which have been freed during execution of the consistency point, wherein the consistency point log comprises a header and at least one entry for each consistency point logged in the consistency point log; and appending a new entry to the consistency point log and updating the header of the consistency point log.

2. The method of claim 1 further comprising:

identifying the one or more freed blocks freed during the consistency point; and transferring the one or more identified freed blocks to a data container.

3. The method of claim 1 wherein the header comprises a total blocks retained field.

4. The method of claim 1 wherein the persistent storage comprises a nonvolatile random access memory.

5. The method of claim 1 wherein performing write allocation further comprises modifying one or more pointers within the delete log to point to the freed blocks.

6. The method of claim 1 wherein the delete log comprises a data container of the freed blocks of the file system.

7. The method of claim 1 further comprising accessing the one or more freed blocks by specifying a timestamp in an access interface.

8. The method of claim 7 wherein the timestamp is associated with a pathname.

9. The method of claim 7 wherein the timestamp is encoded in a file handle to enable access to data stored in the one or more freed blocks.

10. The method of claim 1 further comprising restoring the file system to an earlier point in time by resetting a root block of an active file system to a root block of the earlier point in time, wherein the root block address is saved in the consistency point log.

11. The method of claim 1 further comprising converting the file system with continuous data protection to a file system without continuous data protection by deleting the consistency point log and the delete log.

12. The method of claim 1 further comprising:
detecting that a retention policy threshold has been exceeded;
identifying one or more blocks associated with one or more consistency points exceeding the retention policy threshold; and
freeing the identified block for reuse by the file system.

13. A computer data storage system configured to provide continuous data protection in a file system, comprising:
means for generating one or more persistent consistency point images (PCPIs) of the file system, wherein each PCPI shares one or more file system blocks with at least one other generated PCPI;
means for executing a consistency point during which data changes contained in memory are flushed to persistent storage and one or more data blocks on the persistent storage are freed;
means for performing write allocation of the freed blocks to a delete log to prevent the freed blocks from being reclaimed for reuse by the file system;
means for allowing any of the freed blocks that are subsequently freed from the delete log to be reclaimed by the file system for reuse during future write allocation;
means for updating a consistency point log to list blocks which have been freed during execution of the consistency point, wherein the consistency point log comprises a header and at least one entry for each consistency point logged in the consistency point log; and
means for appending a new entry to the consistency point log and means for updating the header of the consistency point log.

14. The system of claim 13 further comprising:
means for identifying the one or more freed blocks freed during the consistency point; and
means for transferring the one or more identified freed blocks to a data container.

15. The system of claim 13 wherein the header comprises a total blocks retained field.

16. The system of claim 13 wherein the persistent storage comprises a nonvolatile random access memory.

17. The system of claim 13 wherein the means for performing write allocation further comprises means for modifying one or more pointers within the delete log to point to the freed blocks.

18. The system of claim 13 wherein the delete log comprises a data container of the freed blocks of the file system.

19. The system of claim 13 further comprising:
means for detecting that a retention policy threshold has been exceeded;
means for identifying one or more blocks associated with one or more consistency points exceeding the retention policy threshold; and
means for freeing the identified block for reuse by the file system.

20. A computer readable storage medium containing executable program instructions executed by a processor, comprising:
program instructions that generate one or more persistent consistency point images (PCPIs) of a file system, wherein each PCPI shares one or more file system blocks with at least one other generated PCPI;
program instructions that execute a consistency point during which data changes contained in memory are flushed to persistent storage and one or more data blocks on the persistent storage are freed;
program instructions that perform write allocation of the freed blocks to a delete log to prevent the freed blocks from being reclaimed for reuse by the file system;
program instructions that allow any of the freed blocks that are subsequently freed from the delete log to be reclaimed by the file system for reuse during future write allocation;
program instructions that update a consistency point log to list blocks which have been freed during execution of the consistency point, wherein the consistency point log comprises a header and at least one entry for each consistency point logged in the consistency point log; and
program instructions that append a new entry to the consistency point log and program instructions that update the header of the consistency point log.

21. A computer data storage system configured to provide continuous data protection in a file system, comprising:
a consistency point log stored within the file system configured to list a set of blocks which have been freed during execution of a consistency point, wherein the consistency point log comprises a header and at least one entry for each consistency point logged in the consistency point log and further configured to append a new entry to the consistency point log and update the header of the consistency point log;
a delete log comprising the set of blocks freed within the file system; and
a file system module implementing the file system and configured to identify the set of blocks freed during the consistency point.

22. The system of claim 21 wherein the file system is further configured to update the consistency point log with an entry associated with the consistency point.

23. The system of claim 21 wherein the file system is further configured to perform write allocation of the set of blocks freed to the delete log, wherein the identified set of blocks freed are not reclaimed by the file system module for reuse.

24. The system of claim 21 further comprising one or more pointers within the delete log configured to point to one or more freed blocks to perform write allocation.

25. The system of claim 21 wherein the header comprises a total blocks retained field.

26. A method for providing continuous data protection in a storage system, comprising:
updating a consistency point log to list blocks which have been freed during execution of a consistency point, wherein the consistency point log comprises a header and at least one entry for each consistency point logged in the consistency point log;
appending a new entry to the consistency point log and updating the header of the consistency point log;
tracking the blocks freed within the storage system by performing write allocation of the freed blocks to a delete log to prevent the freed blocks from being reclaimed for reuse by the storage system; and
releasing the blocks for reuse by the storage system in accordance with a user retention policy by subsequently freeing the released blocks from the delete log.

27. The method of claim 26 wherein tracking the blocks freed within the storage system further comprises:
identifying one or more of the freed blocks freed during the consistency point; and
transferring the one or more identified freed blocks to a data container.

28. The method of claim 27 further comprising modifying one or more pointers within the delete log to point to one or more freed blocks.

29. The method of claim 26 further comprising:
detecting that a user retention policy threshold has been exceeded;
identifying one or more of the freed blocks associated with one or more consistency points is exceeding the retention policy threshold; and
freeing the identified one or more freed blocks for reuse by the storage system.

30. The method of claim 29 wherein freeing the identified one or more freed blocks for reuse occurs in a first in first out manner in a data container.

31. A method for providing continuous data protection in a storage system, comprising:
logging received data operations in a persistent memory;
replacing data in an operation log with pointers to data blocks written in a checkpoint;
storing, during the course of write allocation, the received write operations in a data operations log;
updating the data operations log to list blocks which have been freed during execution of a consistency point, wherein the data operations log comprises a header and at least one entry for each consistency point logged in the data operations log; and
appending a new entry to the data operations log and updating the header of the data operations log.

32. The method of claim 31 further comprising:
replaying, to access data at a time between two checkpoints, relevant logged operations against an earlier checkpoint to recreate a set of desired data.

33. The method of claim 31 further comprising replicating checkpoints from a local storage system to a remote storage system.

34. The method of claim 31 wherein the persistent memory comprises a nonvolatile random access memory.

35. A method for providing continuous data protection in a storage system, comprising:
retaining data written to the storage system;
permitting access, by a user, to earlier data written to the storage system;
performing write allocation of a freed block to a delete log to prevent the freed block from being reclaimed for reuse by the storage system;
updating a consistency point log to list blocks which have been freed during execution of a consistency point, wherein the consistency point log comprises a header and at least one entry for each consistency point logged in the consistency point log;
appending a new entry to the consistency point log and updating the header of the consistency point log; and
expiring earlier data based on a pre-determined retention policy.

36. A method for providing continuous data protection in a storage system, comprising:
generating one or more persistent consistency point images (PCPIs) of the storage system, wherein each PCPI shares one or more storage system blocks with at least one other generated PCPI;
maintaining, in memory, modifications made to storage system blocks;
executing a consistency point, whereby the modifications are flushed to persistent storage;
freeing, in response to the executed consistency point, one or more data blocks on the persistent storage;
adding, to a delete log, the one or more freed data blocks by inserting pointers of the freed blocks into an inode buffer tree of the delete log;
updating a consistency point log to list the freed blocks which have been freed during execution of the consistency point, wherein the consistency point log comprises a header and at least one entry for each consistency point logged in the consistency point log; and
appending a new entry to the consistency point log and updating the header of the consistency point log.

37. A method for providing continuous data protection in a storage system, comprising:
generating one or more persistent consistency point images (PCPIs) of the storage system, wherein each PCPI shares one or more storage system blocks with at least one other generated PCPI;
maintaining, in a first memory, modified storage system blocks;
executing a consistency point, whereby the modifications are flushed to persistent storage;
freeing, in response to the executed consistency point, one or more data blocks on the persistent storage;
retaining, in one or more blocks of a delete log, the one or more freed data blocks, wherein at least one block of the delete log corresponds to the one or more data blocks previously freed during the consistency point;
updating a consistency point log to list blocks which have been freed during execution of the consistency point, wherein the consistency point log comprises a header and at least one entry for each consistency point logged in the consistency point log; and
appending a new entry to the consistency point log and updating the header of the consistency point log.

38. A computer readable storage medium containing executable program instructions executed by a processor comprising:
program instructions that generate one or more persistent consistency point images (PCPIs) of a storage system, wherein each PCPI shares one or more storage system blocks with at least one other generated PCPI;
program instructions that maintain in a first memory, modifications made to storage system blocks;

program instructions that execute a consistency point, whereby the modifications in the first memory are flushed to a second memory;

program instructions that free in response to the executed consistency point, one or more data blocks on the persistent storage;

program instructions that add to a delete log, the one or more freed data blocks by inserting pointers of the freed blocks into an inode buffer tree of the delete log;

program instructions that update a consistency point log to list the one or more freed data blocks which have been freed during execution of the consistency point, wherein the consistency point log comprises a header and at least one entry for each consistency point logged in the consistency point log; and program instructions that append a new entry to the consistency point log and program instructions that update the header of the consistency point log.

39. A method for providing continuous data protection in a file system, comprising:

generating one or more persistent consistency point images (PCPIs) of the file system, wherein each PCPI shares one or more file system blocks with at least one other generated PCPI;

maintaining, in non-volatile random access memory (NVRAM), modifications made to file system blocks;

executing a consistency point, whereby the modifications in the NVRAM are flushed to persistent storage other than NVRAM;

freeing, in response to the executed consistency point, one or more data blocks on the persistent storage;

adding, to a delete log, the one or more freed data blocks by inserting pointers of the one or more freed blocks into an inode buffer tree of the delete log;

updating a consistency point log to list the one or more freed blocks which have been freed during execution of the consistency point, wherein the consistency point log comprises a header and at least one entry for each consistency point logged in the consistency point log; and appending a new entry to the consistency point log and updating the header of the consistency point log.

* * * * *

UNITED STATES PATENT AND TRADEMARK OFFICE
CERTIFICATE OF CORRECTION

| | | |
|---|---|---|
| PATENT NO. | : 7,769,723 B2 | Page 1 of 1 |
| APPLICATION NO. | : 11/413882 | |
| DATED | : August 3, 2010 | |
| INVENTOR(S) | : Ling Zheng et al. | |

It is certified that error appears in the above-identified patent and that said Letters Patent is hereby corrected as shown below:

Col. 16, Line 14, please replace "is less than" with "less than"

Signed and Sealed this

Thirtieth Day of November, 2010

David J. Kappos
*Director of the United States Patent and Trademark Office*